(12) United States Patent
Syeda-Mahmood

(10) Patent No.: US 12,086,565 B2
(45) Date of Patent: Sep. 10, 2024

(54) MEANING AND SENSE PRESERVING TEXTUAL ENCODING AND EMBEDDING

(71) Applicant: International Business Machines Corporation, Armonk, NY (US)

(72) Inventor: Tanveer Syeda-Mahmood, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 17/682,028

(22) Filed: Feb. 28, 2022

(65) Prior Publication Data

US 2023/0274098 A1 Aug. 31, 2023

(51) Int. Cl.
 G06F 40/56 (2020.01)
 G06F 40/247 (2020.01)
 G06F 40/30 (2020.01)

(52) U.S. Cl.
 CPC ............ *G06F 40/56* (2020.01); *G06F 40/247* (2020.01); *G06F 40/30* (2020.01)

(58) Field of Classification Search
 None
 See application file for complete search history.

(56) References Cited

U.S. PATENT DOCUMENTS

| 2006/0248053 A1* | 11/2006 | Sanfilippo | G06F 16/355 |
| 2019/0130221 A1 | 5/2019 | Bose et al. | |
| 2020/0057946 A1* | 2/2020 | Singaraju | G06N 20/00 |
| 2021/0019374 A1 | 1/2021 | Donaldson et al. | |
| 2021/0365485 A1 | 11/2021 | Kohita et al. | |

(Continued)

FOREIGN PATENT DOCUMENTS

| CN | 111309915 A | 6/2020 |
| CN | 111859987 A | 10/2020 |

(Continued)

OTHER PUBLICATIONS

International Search Report and Written Opinion dated May 10, 2023 for International Application No. PCT/CN2023/074165, 7 pages.

(Continued)

*Primary Examiner* — Stella L. Woo

(74) *Attorney, Agent, or Firm* — Stephen J. Walder, Jr.; Kristofer Haggerty

(57) ABSTRACT

Mechanisms for implementing a text encoder and text encoder operations are provided. A contrastive machine learning training operation trains an encoder of a machine learning computer model, to learn a sense and similarity preserving embedding that operates to encode input natural language text data to generate encoded natural language text data based on a sense attribute of one or more terms in the input natural language text data. The contrastive machine learning training operation learns to separate positive samples in training data from negative samples in the training data. The trained encoder processes a term specified in an input natural language text to generate an encoded natural language text based on the learned embedding and inputs, to a downstream computing system, the encoded natural language text to cause the downstream computing system to perform a computer natural language processing operation based on the embedding.

20 Claims, 7 Drawing Sheets

(56) References Cited

U.S. PATENT DOCUMENTS

| | | | |
|---|---|---|---|
| 2021/0397792 A1* | 12/2021 | Atallah | G06F 40/247 |
| 2022/0101161 A1* | 3/2022 | Goel | G06N 20/00 |
| 2022/0164600 A1* | 5/2022 | Cheng | G06N 3/045 |
| 2023/0140981 A1* | 5/2023 | Pouran Ben Veyseh | G06F 16/367 704/9 |

FOREIGN PATENT DOCUMENTS

| | | |
|---|---|---|
| CN | 109344403 B | 11/2020 |
| CN | 111460077 B | 11/2020 |
| CN | 113486647 A | 10/2021 |

OTHER PUBLICATIONS

Anwar, Saba et al., "Generating Lexical Representations of Frames using Lexical Substitution", Proceedings of the Probability and Meaning Conference (PaM 2020), Oct. 14-15, 2020, pp. 95-103.

Bartusiak, Roman et al., "WordNet2Vec: Corpora Agnostic Word Vectorization Method", arXiv: 1606.03335v1 [cs.CL], Jun. 10, 2016, 29 pages.

Brown, Tom et al., "Language Models are Few-Shot Learners", arXiv:2005.14165v4 [cs.CL], Jul. 22, 2020, 75 pages.

Devlin, Jacob et al., "BERT: Pre-training of Deep Bidirectional Transformers for Language Understanding", Proceedings of the 2019 Conference of the North American Chapter of the Association for Computational Linguistics: Human Language Technologies (NAACL-HLT 2019), vol. 1 (Long and Short Papers), Jun. 2-7, 2019, 16 pages.

Gao, Tianyu et al., "SimCSE: Simple Contrastive Learning of Sentence Embeddings", arXiv:2104.08821v1 [cs.CL], Apr. 18, 2021, 16 pages.

Giorgi, John M. et al., "DeCLUTR: Deep Contrastive Learning for Unsupervised Textual Representations", arXiv:2006.03659v2 [cs.CL], Jun. 11, 2020, 22 pages.

Horn, Franziska et al., "Predicting Pairwise Relations with Neural Similarity Encoders", arXiv:1702.01824v2 [stat.ML], Jan. 9, 2019, 10 pages.

Jimenez, Sergio et al., "word2set: WordNet-Based Word Representation Rivaling Neural Word Embedding for Lexical Similarity and Sentiment Analysis", IEEE Computational Intelligence Magazine, vol. 14, No. 2, May 2019, 14 pages.

Khosla, Prannay et al., "Supervised Contrastive Learning", 34th Conference on Neural Information Processing Systems (NeurIPS2020), arXiv:2004.11362v4 [cs.LG], Dec. 10, 2020, 23 pages.

Kutuzov, Andrey et al., "Learning Graph Embeddings from WordNet-based Similarity Measures", Proceedings of the Eighth Joint Conference on Lexical and Computational Semantics, Jun. 6-7, 2019, 11 pages.

Lastra-Diaz, Juan J. et al., "A reproducible survey on word embeddings and ontology-based methods for word similarity: Linear combinations outperform the state of the art", Elsevier, Engineering Applications of Artificial Intelligence, vol. 85, Oct. 2019, 21 pages.

Mao, Rui et al., "Word Embedding and WordNet Based Metaphor Identification and Interpretation", Proceedings of the 56th Annual Meeting of the Association for Computational Linguistics (Long Papers), Jul. 15-20, 2018, 10 pages.

Melamud, Oren et al., "A Simple Word Embedding Model for Lexical Substitution", Proceedings of the North American Chapter of the Association for Computational Linguistics—Human Language Technologies (NAACL_HLT 2015), May 31-Jun. 5, 2015, pp. 1-7.

Mikolov, Tomas et al., "Distributed Representations of Words and Phrases and their Compositionality", Advances in neural information processing systems, Oct. 2013, 9 pages.

Mikolov, Tomas et al., "Efficient Estimation of Word Representations in Vector Space", International Conference on Learning Representations (ICLR), May 2-4, 2013, submitted version from arXiv:1301.3781v3 [cs.CL], Sep. 7, 2013, 12 pages.

Miller, George A., "WordNet: A Lexical Database for English", Association for Computing Machinery, Communications of the ACM, vol. 38, No. 11, Nov. 1995, pp. 39-41.

Pennington, Jeffrey et al., "GloVe: Global Vectors for Word Representation", Proceedings of the 2014 Conference on Empirical Methods in Natural Language Processing (EMNLP), Oct. 25-29, 2014, pp. 1532-1543.

Peters, Matthew E. et al., "Deep contextualized word representations", Proceedings of the 2018 Conference of the North American Chapter of the Association for Computational Linguistics: Human Language Technologies (NAACL-HLT 2018), vol. 1 (Long Papers), Jun. 1-6, 2018, 11 pages.

Saedi, Chakaveh et al., "WordNet Embeddings", Proceedings of the 3rd Workshop on Representation Learning for NLP, Jul. 20, 2018, 10 pages.

Wu, Zhibiao et al., "Verb Semantics and Lexical Selection", Proceedings of the 32nd Annual Meeting on Association for Computational Linguistics, Jun. 1994, 6 pages.

Zhang, Dejiao et al., "Supporting Clustering with Contrastive Learning", arXiv:2103.12953v1 [cs.LG], Mar. 24, 2021, 12 pages.

\* cited by examiner

| Query | Word2Vec-300 matches | Glove – 300 matches | Present Invention |
|---|---|---|---|
| Glass (Glass.n.02.glass) | ('R._Mazzei_fused', 0.66) ('Christian_Audigier_nightclub', 0.66) ('copper_alloy_garnets', 0.63) ('Nelmeus', 0.62) ('fiber_fusion_splicing', 0.62) ('Plexiglass', 0.58) | ('plastic', 0.79) ('metal', 0.77) ('walls', 0.77) ('marble', 0.76) ('wood', 0.762) | ('beer_glass.n.01.beer_glass', 0.91) ('glass.n.02.drinking_glass', 0.89) ('goblet.n.01.goblet', 0.84) ('tumbler.n.02.tumbler', 0.76) ('abstraction.n.06.abstract_entity', 0.23) |
| Cloud (Cloud.n.02.cloud) | ('clouds', 0.76) ('Cloud', 0.60) ('Abu_Risha_assassination', 0.59) ('Carefully_cautiously', 0.58) ('cloud_computing', 0.58) | ('clouds', 0.82) ('dust', 0.76) ('horizon', 0.73) ('beneath', 0.72) ('surface', 0.71) | ('atmospheric_phenomenon.n.01.atmospheric_phenomenon', 0.99) ('cirrus.n.02.cirrus_cloud', 0.91) ('nimbus.n.01.rain_cloud', 0.82) ('cloud_bank.n.01.cloud_bank', 0.56) ('stratus.n.01.stratus', 0.43) |

*FIG. 1*

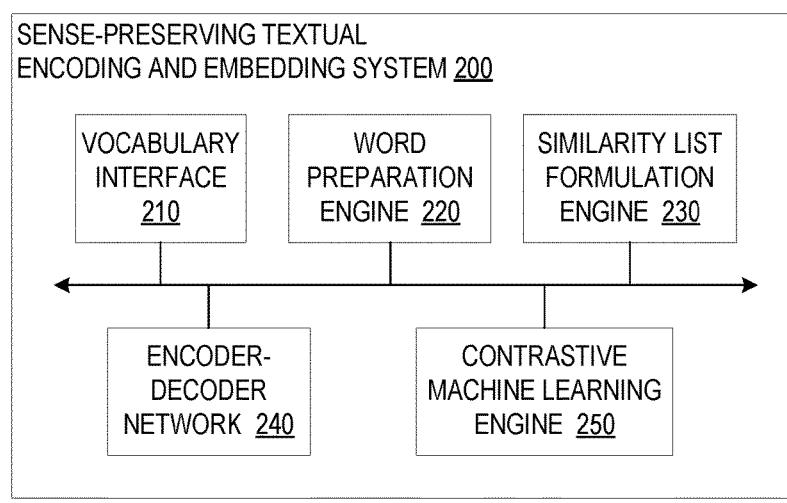

*FIG. 2*

| | | |
|---|---|---|
| rocking_chair.n.01 | rocking_chair.n.01.rocking_chair | {'chair.n.01.chair','rocking_chair.n.01.rocking_chair', 'shoofly.n.01.shoofly', 'seat.n.03.seat', 'boston_rocker.n.01.boston_rocker'} |
| bouquet.n.01 | bouquet.n.01.bouquet | {'decoration.n.01.ornamentation', 'decoration.n.01.ornament', 'bouquet.n.01.corsage', 'bouquet.n.01.bouquet', 'bouquet.n.01.nosegay', 'decoration.n.01.decoration', 'bouquet.n.01.posy'} |
| hand_brake.n.01 | hand_brak.n.01.emergency | {'restrain.n.06.constraint', 'hand_brake.n.01.emergency_brake', 'restraint.n.06.restraint', 'hand_brake.n.01.hand_brake', 'hand_brake.n.01.parking_brake', 'hand_brake.n.01.emergency', 'brake.n.01.brake'} |
| van.n.03 | van.n.03.van | {'van.n.03.van', 'car.n.02.railway_car', 'wheeled_vehicle.n.01.wheeled_vehicle', 'car.n.02.car', 'car.n.02.railcar', 'car.n.02.railroad_car'} |
| van.n.04 | van.n.04.van | {'recreational_vehicle.n.01.r.v.', 'camper.n.02.camping_bus', 'recreational_vehicle.n.01.recreational_vehicle', 'van.n.04.van', 'camper.n.02.camper', 'van.n.04.caravan', 'camper.n.02.motor_home', 'recreational_vehicle.n.01.rv'} |
| van.n.05 | van.n.05.van | {'bookmobile.n.01.bookmobile', 'truck.n.01.truck', 'truck.n.01.motortruck', 'police_van.n.01.paddy_wagon', 'delivery_truck.n.01.panel_truck', 'motor_vehicle.n.01.automotive_vehicle', 'moving_van.n.01.moving_van', 'minivan.n.01.minivan', 'police_van.n.01.black_maria', 'police_van.n.01.police_wagon','motor_vehicle.n.01.motor_vehicle', 'milk_float.n.01.milk_float', 'patechnicon.n.01.pantechnicon', 'police_van.n.01.patrol_wagon', 'police_van.n.01.police_van', 'police_van.n.01.wagon', 'laundry_truck.n.01.laundry_truck', 'passenger_van.n.01.passenger_van', 'delivery_truck.n.01.delivery_truck', 'delivery_truck.n.01.delivery_van', 'van.n.05.van'} |

*FIG. 3*

MEANING AND SENSE PRESERVING TEXTUAL ENCODING AND EMBEDDING

BACKGROUND

The present application relates generally to an improved data processing apparatus and method and more specifically to mechanisms for performing textual encoding that preserves the meaning and sense of the original text.

Textual encoding and embedding methods have become popular in recent artificial intelligence (AI) literature for many downstream uses including language translation, sentiment analysis, and even zero shot learning in computer vision. Textual encoding methods give numeric representations to text, e.g., numeric representations of words or groups of words in text. Textual embeddings project textual words, phrases, sentences, and the like to points in a multi-dimensional space. The goal of such an embedding process is to produce a multi-dimensional space in which distance between points represents similarity between the corresponding concepts.

Various embedding mechanisms have been developed, with word embedding being a widely used technique. Word embedding is a mechanism for representing words in text as real number, vector representations. Such vector representations may have a large number of dimensions. Word embeddings are used with a number of different AI and natural language processing computing systems and may make use of various types of text encodings, such as a one-hot encoding. The one-hot encoding mechanism is a type of categorical data encoding where the vector has N dimensions, and thus N vector slots, where N is the size of the recognized categories, e.g., the words in a recognized vocabulary, and values in the vector slots are either a 0 or a 1, where 1 represents the correct category (e.g., word) and 0 represents "not the category" (e.g., not the word). A portion of text may be represented by the combined vector representations of the words present in the text.

Word encodings and embeddings are used with AI mechanisms, such as neural networks and other AI mechanisms, that process text by vectorizing the words in the text. An example of one type of AI mechanism that utilizes such vectorization of text is the Word2Vec mechanism which provides a two-layer neural network that receives a text corpus and outputs a set of vectors, i.e., feature vectors, that represent words in that text corpus. Word2Vect converts text into a numerical form that deep neural networks and other natural language processing (NLP) and AI mechanism can understand and operate upon to perform their corresponding functions.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system comprising at least one processor and at least one memory, the at least one memory comprising instructions that are executed by the at least on processor to cause the at least one processor to be specifically configured to implement a text encoder. The method comprises training, by a contrastive machine learning training operation, an encoder of a machine learning computer model, to learn a sense and similarity preserving embedding. The sense and similarity preserving embedding operates to encode input natural language text data to generate encoded natural language text data based on a sense attribute of one or more terms in the input natural language text data. The contrastive machine learning training operation operates to learn to separate positive samples in training data from negative samples in the training data. The method further comprises processing, by the trained encoder computer model, a first term specified in an input natural language text to generate an encoded natural language text based on the learned sense and similarity preserving embedding. Moreover, the method comprises inputting, to a downstream computing system, the encoded natural language text, to cause the downstream computing system to perform a computer natural language processing operation on the encoded natural language text data based on the sense and similarity preserving embedding.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 depicts examples of query results retrieved for query terms "cloud" and "glass" by two embedding mechanisms;

FIG. 2 is an example diagram illustrating the primary operational components of a sense-preserving textual encoding and embedding computing system in accordance with one illustrative embodiment;

FIG. 3 illustrates similarity lists or sets generated from this curation process for a small subset of words in noun form in accordance with a word representation according to one illustrative embodiment;

DETAILED DESCRIPTION

Figure 4:
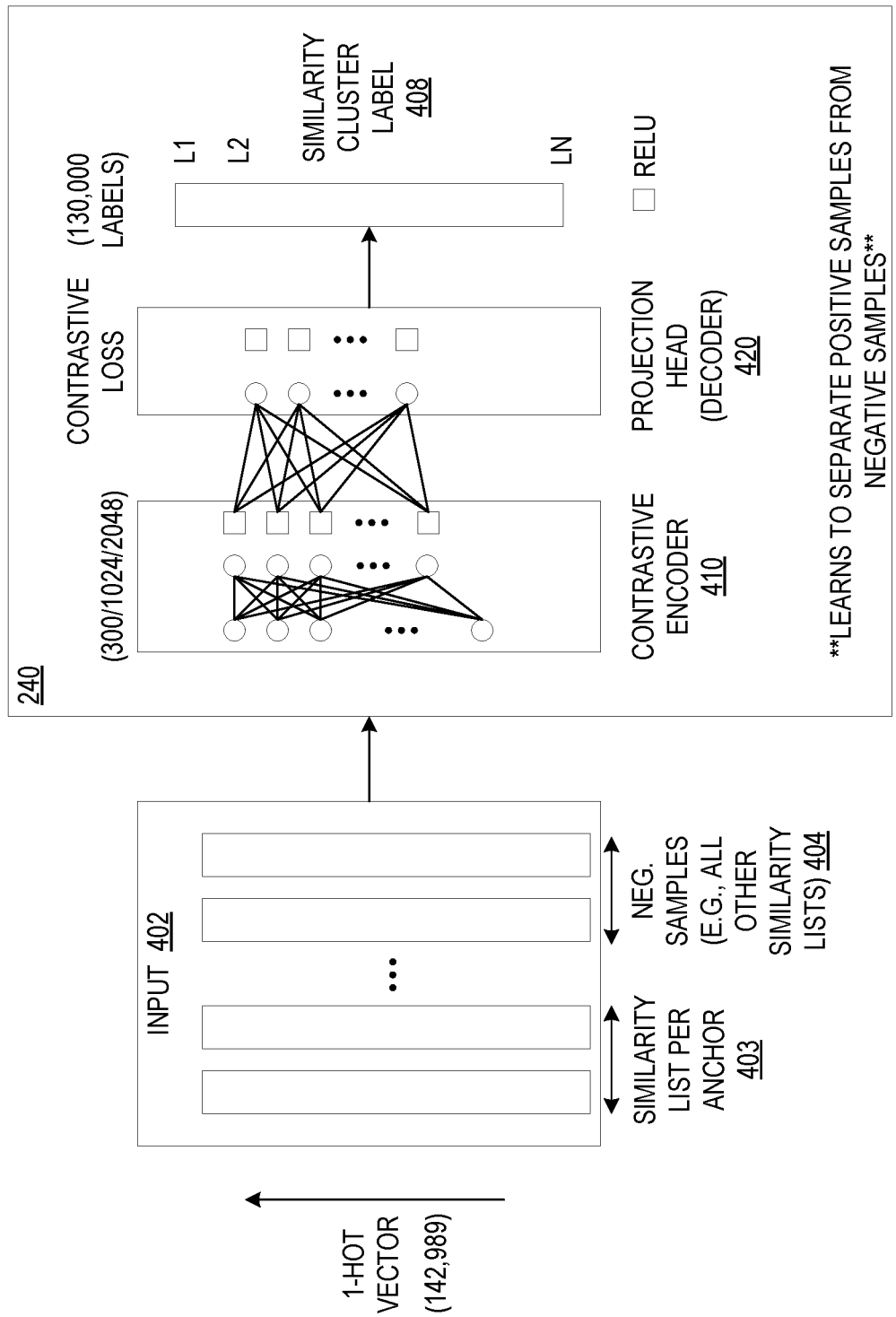
FIG. 4 is an example diagram of the encoder-decoder network in accordance with one illustrative embodiment.

As described previously, textual encoding and embedding mechanisms have been developed for use in representing human understandable text into a numerical representation that computing systems are able to process, such as artificial intelligence (AI) and natural language processing (NLP) based computing systems. In some cases, these textual encoding and embedding mechanisms may operate on portions of text that include more than the current term that is to be represented by the numerical representation, e.g., the context of the word being represented by the vector representation, so as to attempt to capture the meaning of the word. Textual encoding methods have become popular in recent AI literature for many downstream uses ranging from language translation, sentiment analysis to zero shot learning in machine learning based computer vision AI mechanisms. That is, state of the art models are now trained on millions of sentences to produce encodings that are being used not only for language generation and sentiment analysis, but also in computer vision for ad hoc learning of image-class associations.

However, these mechanisms only weakly capture word meaning through the use of context information. Moreover, these mechanisms often generate incorrect results due to limitations in the ability to accurately represent the true meaning of words that have potentially various meanings and senses. In linguistics, a word "sense" is one of the meanings of a word. For example, Table 1 below lists senses for two common words. The number of senses is a function of the term itself, and currently can vary from 1 to as many as 31 for the term "head" when treated as a noun in English. In Table 1, the senses, in accordance with one illustrative embodiment of the present invention, are represented by a tuple that includes the term, the part of speech, and a numerical reference to a particular sense of the word, e.g., "01" refers to the first recognized sense of the word and "03" refers to the third sense of the word.

TABLE 1

Word Senses for Two Example Words

| Term | Senses | Definition |
| --- | --- | --- |
| dog | dog.n.01 | a member of the genus *Canis* |
| dog | dog.n.03 | informal term for a man |
| capsule | capsule.n.01 | a small container |
| capsule | capsule.n.02 | a pill |
| capsule | capsule.n.03 | a vessel |
| capsule | capsule.n.05 | a condensed prose |

With advances in wider span context-aware embeddings using deep neural network language models (the term "model" is used throughout this description to refer to specifically AI computer models), such as ELMo, BERT, and OpenAI GPT, performance may be improved, however none of the methods can guarantee the preservation of meaning during retrieval of query results, especially when the query terms do not provide sufficient context. In fact, studies testing the mean average precision of such text embedding mechanisms, for retrieval of words similar in meaning, have shown that these text embedding mechanisms provide very poor results, e.g., providing precision below 3%. In addition, with these approaches, the use of proprietary text mined for creating the embedding makes it difficult to compare. When the words used for queries fall outside the known vocabulary used to train these deep neural network language models, poor results are obtained. When different deep neural network language models are trained on different vocabularies, the models are not directly comparable. Furthermore, if the raw text from which these deep neural network language models are trained is not exposed, then extensions of the vocabularies are not readily able to be provided for improving the performance of such models.

FIG. 1 shows examples of query results retrieved for query terms "cloud" and "glass" by two embedding mechanisms, i.e., the Word2Vec mechanism previously mentioned above, and the Glove mechanism. FIG. 1 shows that even in the top few hits, the matches need not be similar in meaning. For example, the top hits for the Word2Vec mechanisms with regard to the query for "glass" are "Christian_Audigier_neightclub" and "R_Mazzei_fused" with a 66% confidence. The top hits using the Glove mechanism are "plastic" with a 79% confidence, and "metal" and "walls" with a 77% confidence. The top hits for mechanisms of the illustrative embodiments, as will be described hereafter, are much improved over these other mechanisms, with "beer_glass" at a 91% confidence and drinking_glass with a 89% confidence. In fact, within a top 10 hit list, a variety of unrelated matches to the query term are seen even when the top two hits may be correct, as in the query for "cloud". This lowers the confidence in the model as truly understanding what the request was about if the results are arbitrary in this way.

While semantic specialization methods have been introduced for incorporating structured linguistic knowledge from external resources to word embeddings, the manner in which they are incorporated does not offer any guarantees on the preservation of meaning and word senses. A good source for capturing the vocabulary of words, their meaning, and senses, is a thesaurus, such as WordNet, which is available for English and other languages. Thesaurus mechanisms may be used to vectorize words or obtain lexical relationships, however, these thesaurus mechanisms have not been used to produce a meaning and sense similarity-preserving word embedding where the meaning and sense are sufficiently guaranteed to be preserved during retrieval of query results. To the contrary, thesaurus mechanisms base their retrieval results purely on similarity metrics, such as shortest path within the ontology, depth metrics, etc. Since the ontologies were not designed keeping such similarity metrics in scope, their arrangement in the hierarchy may reflect different types of relationships in a graphical form rather than semantic distance. For example, the terms "car" and "van" in the WordNet ontology are 16 "hops" away from each other along a shortest path while "car" and "automobile" are only 1 hop away from each other, even though "car" and "van" are semantically quite related in everyday meaning. The same is true of depth based metrics, e.g., Wu-Palmer (WUP) metric, which can provide similar scores for vastly different meaning words, e.g., "dog" and "giant panda" have a high WUP score of 0.87 indicating that "dog" and "giant panda" are highly similar to each other, when they clearly are not.

In addition to the problems associated with similarity metrics being the source of similar word identification, existing embedding mechanisms mix similarity in meaning with other types of relationships including antonyms, meronyms, etc. so the word comparison score does not have a clear meaning. Due to this, and the nature of loss functions that are used, the resulting projected vectors may be close together even if they are not similar and vice versa, i.e., similar in meaning vectors may be far from each other. For example, the differentiation between matches is not as great in a top K retrieval, e.g., the word "dog" is placed close to "raccoon" (0.71 score in path2vec).

Thus, existing approaches to word embeddings drawn from textual collections inherently cannot ensure closeness in meaning in the embedding space, cannot preserve the sense of the word in the embedding space, and provide embedding vectors that vary with the vocabulary and the usage sentences. For example, with regard to ensuring closeness in meaning in the embedding space, existing approaches to word embedding, in computing systems that use these word embeddings to identify similar matching words/terms, only a small fraction of matches retrieved are actually similar in meaning, with many similar in meaning words not being retrieved. Thus, the performance of these computing systems provides low precision and recall.

With regard to preserving the sense of the word in the embedding space, consider the example of the word "glasses". With such a word, it is not readily apparent whether the term "glasses" is referring to a drinking vessel, such as a wine glass, or a tool to assist with vision, e.g., eyeglasses, given the word itself. Existing word embedding mechanisms are not able to distinguish between multiple different senses of the word and as a result, computing systems using such existing embeddings often will return results that have a mixture of senses, again with the sense of the word being a distinct meaning of the word in linguistics, where words can have different senses or meanings for the same or different parts of speech, e.g., noun, verb, adjective, etc. Since a language as captured in a thesaurus, has already established the different senses and meaning of words, their vector representations should reflect that directly. In other words, the number of vector representations of a word should match their number in sense and meaning. In current sentence-based embeddings, the vector representation of a word is based on its usage context and will differ from sentence to sentence as a function of sentence rather than remain stable based on its meaning and sense.

Moreover, existing approaches to word embeddings use language vocabularies that are relatively small compared to the entirety of the vocabulary of the actual language represented. For example, in current language vocabularies, only approximately 50,000 unique words are represented, when the language itself has many more unique words. Because of this, when a word encoding/embedding mechanism encounters an out of vocabulary word, the word encoding/embedding mechanism must represent the word in some way. In existing approaches, the out of vocabulary word is represented by averaging the recognized terms of the word. For example, if the word were "desert mouse", the encoding/embedding mechanism will average the values for the vectors for "desert" and "mouse", e.g., ½ (vector(desert)+vector(mouse)), resulting in a vector that does not resemble desert nor mouse, and a vector that is most likely not representative of anything resembling a "desert mouse".

Because of these significant limitations in existing encoding and embedding mechanisms, it is a significant issue in AI computing systems that so many developers of AI computing systems and machine learning computer models have become dependent on such text encoding and embedding mechanisms for implementing their AI computer systems, as they are limited by the capabilities of these encodings/embeddings and the problems noted above. Thus, a textual embedding computing tool and embedding computing tool operation that can correct the above limitations will create significant impact to the field of AI computing and machine learning, and help in its advancement.

The illustrative embodiments provide an improved computing tool and improved computing tool operations that provide a novel word embedding that is designed to capture similarity in the meaning and sense of words, which may include multi-word terms. Specifically, the improved computing tool and improved computing tool operations use a language thesaurus tool and corresponding database to assemble a large ground truth list of words and their similarity sets. A sense and similarity preserving embedding is then learned for the similarity sets using a novel contrastive loss mechanism and a novel adaptive batching strategy designed for efficiently learning very large numbers of labels. The resulting embedding significantly outperforms existing embedding mechanisms in mean average precision over a large number of word similarity queries.

The mechanisms of the illustrative embodiments provide a fundamental advancement in the area of textual embedding which preserves not only meaning of the word, but also the sense of use of the word, both of which are directly reflected in a numerical form. With the mechanisms of the illustrative embodiments, given a query specifying a word, such as "glass", the mechanisms of the illustrative embodiments understand that there are multiple senses of the word and automatically expand the query and results to reflect specific senses of the query term and results. In particular, through the mechanisms of the illustrative embodiments, due to query terms and results having potentially many different senses, mechanisms are provided to capture these senses and allow a source of a query, e.g., a user, an automated process, or the like, to specify the relevant senses of particular interest to the query being provided, while keeping a default sense based on popular usage contexts. As will be described in greater detail hereafter, the illustrative embodiments utilize a novel representation of a word as including not only the word itself, but also the part of speech, the sense, and the synonyms or word form variant of the word, such that among these other features of the word embedding, the sense of the word is represented in the embedding, the query, and the results returned. It should be appreciated that throughout this description, references to a "word" may include both single words and multi-term words.

Thus, for example, when given a specific sense of the query word, such as when "glass.n.02.glass" is specified by the user, by an automated process, or by another source of the query, the mechanisms of the improved computing tool of the illustrative embodiments have logic and data structures that facilitate an understanding of the sense desired and are able to provide query results that correspond to that particular sense of the query term. For example, in the "glass" example above, by identifying the sense as "glass.n.02.glass", where the sense is represented by "02" in this embedding, meaning that the recognized second sense of the word is specified, e.g., a vessel for consuming liquids, the mechanisms of the improved computing tool of the illustrative embodiments are able to determine that the sense of the query term "glass" desired is of the popular notion of the query term "glass" as a vessel for consuming liquids, e.g., a drinking glass, as opposed to other senses of the term "glass", and will return the following example matches:

0 glass.n.02.glass 1.0
    1 glass.n.02.drinking_glass 0.8479989
    2 flute.n.02.flute 0.6277488
    3 beer_glass.n.01.beer_glass 0.6266742
    4 wineglass.n.01.wineglass 0.6116342
    5 shot glass.n.01.jigger 0.5887388
    6 goblet.n.01.goblet 0.58315945
    7 flute.n.02.champagne flute 0.56700206
    8 schooner.n.01.schooner 0.5624424
    9 seidel.n.01.seidel 0.5515193
    10 rummer.n.01.rummer 0.5497051

In the above, the rankings 0-10 represent the relative ranks of the matching terms, specified by the names, e.g., "glass.n.02.glass", and the numeric values are the confidence scores or probabilities that the named word matches the query term.

In order to provide such an improved computing tool and improved computing tool operations that are capable of discerning between multiple possible senses of a query term and multiple possible senses of results, the illustrative embodiments provide a contrastive machine learning operation and corresponding mechanisms to build an AI computer model, such as a neural network computer model having an encoder-decoder network, using a labeled dataset drawn from one or more language ontology data structures. The labeled dataset is a data structure that comprises unidirectional similarity sets of potentially multi-word terms which are created using a semi-automatic curation process followed by a manual curation by linguistic experts. A sense and similarity preserving embedding is then automatically learned by the AI computer model through machine learning tools and machine learning operations for the similarity sets using a contrastive loss and adaptive batching strategy designed for efficiently learning very large numbers of labels.

With the mechanisms of the illustrative embodiments, a vocabulary is selected that is to serve as the basis for learning word embeddings. This vocabulary, such as WordNet or the like, is preferably a vocabulary with associated ontology data structures that capture relationships between the words reflecting similarity in meaning and levels of abstraction, such as hypernyms, hyponyms, and the like. Examples of such vocabularies may include WordNet, clinical knowledge ontologies, financial industry ontologies, or the like. In accordance with the mechanisms of the illustrative embodiments, the representations of words within these ontologies is expanded to include specifications of word sense through a process of traversing the ontology and generating a tuple representation of each word that includes the word, or word name, part of speech (POS), sense, and synonym.

Thus, with the mechanisms of the illustrative embodiments, a novel specification of a word, potentially a multi-word term, in an ontology or vocabulary (it is assumed for purposes of this description that a vocabulary is represented by one or more ontology data structures) is provided that reflects the word's part of speech (POS), sense or meaning, and synonym variants. For example, in some illustrative embodiments a word may be represented by the vector or tuple $W_i = <w_i, p_i, s_i, l_i>$ or "$w_i.p_i.s_i.l_i$", where $w_i$ is the multi-word term, $p_i$ is a part of speech (POS) which in one illustrative embodiment is $p_i \in \{n,a,v,r,s\}$ which stand for noun, adjective, verb, adverb, and adjective satellite, respectively, $l_i \in Synonym(w_i)$ is a synonym or word form variant (also referred to as a lemma), and $s_i$ stands for the sense of the word and is a number from 1 to n, where n is the total number of different senses recognized for the particular term. It should be noted that different words or terms (as "word" and "term" are used interchangeably) may have different values for "n" depending on the number of senses recognized for that word, e.g., there may be 4 senses for the word "glass" and 5 senses for the word "dwelling". Moreover, there may be multiple different representations for the same word depending on the specific part of speech, sense of the word, and its synonyms. Thus, as an example, the word "block" is both a noun and a verb. The word "glass" may mean "glass.n.01.plexi_glass" and "glass.n.02.eye_glasses" in two of its senses.

Having represented each word in the selected vocabulary as one or more tuples of word name, POS (part-of-speech), sense, and synonym, an initial similarity list is generated for each word using a similarity measure on the vocabulary ontology data structure. Thus, for example, given a vocabulary ontology data structure, the ontology is traversed using the hypernym and synonym relationships, and those terms that are within a specified depth distance, e.g., 2, and which have a threshold similarity score, e.g., a WUP of 0.8, are selected for inclusion in the initial similarity list, which is represented as a similarity list data structure. This may be performed, for example, for single and/or multi-word terms, and may result in the creation of multiple similarity lists which may be overlapping, i.e., the same term may be present in more than one similarity list. It should be appreciated that if no ontology data structures are present for the vocabulary, then the similarity list data structure(s) may be generated through a manual process. It should be appreciated that the similarity list data structure(s) for a given term, or multi-word term, may be referred to herein as a "similarity cluster."

The similarity list data structure(s) are used to perform a training of the machine learning computer model, e.g., neural network model, to produce embeddings using multi-label group contrastive loss. Specifically, a contrastive encoder with a projection head is used to train the encoder of the machine learning computer model, e.g., the neural network model. The input to the contrastive encoder is a 1-hot vector representing each term in the vocabulary, or in some illustrative embodiments, specifically each multi-word term in the vocabulary. The output attached to the projection head is a binary pattern vector in which the term, or multi-word term, similar to the given input term, or multi-word term, is given a 1 and the rest of the terms are given a value of 0. In other words, the label vector is as long as the input 1-hot vector, but unlike the input which is 1 only at the target term, or multi-word term, the output label vector is a binary pattern vector which has as many 1's as the size of the similarity list for the input term, or multi-word term, and at the respective word positions corresponding to those similar terms, or multi-word terms.

The embedding that is learned is one that projects words in the same similarity cluster closer to each other in the embedding space while separating them from words belonging to other clusters when the clusters are non-overlapping. The neural network model is trained using a contrastive learning methodology in which the encoder is a dense fully connected layer with rectified linear activation function (ReLU) activation and the projection network, is another fully connected layer with ReLU activation. The encoder maps the 1-hot encoding of a word to a representation vector normalized to unit hypersphere, and the projection network renders the output to match the expected binary pattern vector.

The learning of this embedding is a complex learning problem since ultimately, pairwise similarity comparisons need to be made for all words, each of which is a high-dimensional vector. Specifically, for encoding the Wordnet ontology for nouns alone, 142,989×142,989/2 comparisons of 142,989 long vectors each would need to be performed to correspond to the 142,989 unique nouns in Wordnet. To make this problem feasible, a novel batching mechanism is utilized by the mechanisms of the illustrative embodiments based on the similarity clusters. This batching mechanism divides up the similarity clusters into batches of size 1000 each, into which as many similarity clusters, that can completely fit within the batch, are provided, where the similarity clusters have a predetermined maximum size or less, e.g., a size of 200 words or less. By packing multiple clusters per batch, positive-negative example scenarios are automatically created which are used for contrastive learning, making simultaneous separation of labels possible. The resulting learning is efficient and the whole embedding can be learned in a relatively short period of time, e.g., empirical results indicate that an entire vocabulary word embedding can be learned in under 1 hour.

For example, in one illustrative embodiment, assuming again an example using just the nouns in Wordnet, each training sample is a pair of input one-hot vector for the target word that is 142,989 wide, and a binary pattern label vector that corresponds to the training sample's similarity list. The binary pattern label vector is also 142,989 wide since both the one-hot vector and the binary pattern label vector cover the entire vocabulary. It should be appreciated that these dimensions may change since the illustrative embodiments are applicable to any ontology with its corresponding vocabulary sizes. Thus, the size "1000" in this example refers to 1000 such pairs of target term, or multi-word term, and its similarity cluster/list. Ideally, for a contrastive learning formulation, a batch for learning would have the target word paired with a positive pair and the remaining being negative. Since there are a large number of pairings to learn, a batch is formed consisting of multiple pairs of positive and negative pairs coming from multiple target terms, or multi-word terms. In one illustrative embodiment, approximately 200 of the 1000 pairs are used as positive pairs and the remaining are negative. A positive pair is a target term, or multi-word term, and some member of its similarity cluster/list. Since each similarity list is variable in size, the number of positive pairs per term, or multi-word term, is variable as well. For similarity clusters having a size over the predetermined maximum, larger batch sizes are formed that maintain the same fit ratio, however, when the size is greater than the predetermined maximum, then the pairing with the target term may have to be repeated across the batches. For the majority of words, the similarity lists are of size 8 or less, so that all their positive pairs can be easily included in a batch and their encoding can be learned in one shot. It should be noted that for the Wordnet example above, 142989× 142989 pairs would need to be learned, which would take many months to train the neural network model without the novel batching mechanisms of the illustrative embodiments. By batching into sizes of, for example, approximately 1000, and expecting an average size of similarity lists to be approximately 8, the number of target words trained per batch is 200/8=25 or 5720 batches instead of 142989 batches.

The resulting embedding significantly outperforms existing embedding methods in meaningful retrieval, improving the mean average precision by orders of magnitude on a large number of word queries. Another advantage is that the learned embedding's source is the language itself rather than a source of text. This makes the learned embedding easy to reproduce and reuse and can be adopted as a standard embedding per language.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As mentioned above, the illustrative embodiments provide an improved computing tool and improved computing tool operations that implement a novel textual embedding that is designed to capture similarity in the meaning and sense of words, which may include single-word terms, such as "mouse", or multi-word terms, such as "desert mouse". The novel textual embedding uses a supervised contrastive learning approach to build an encoder using a labeled dataset drawn from the ontology data structure(s) of a selected vocabulary. Unidirectional similarity sets or lists of words are created using a semi-automatic curation process based on a similarity measure followed by a manual curation by linguistic experts. A sense and similarity preserving embedding is then learned for the similarity sets using a novel contrastive loss and an adaptive batching strategy designed for efficiently learning very large numbers of labels. The resulting embedding significantly outperforms existing embedding mechanisms in meaningful retrieval, improving the mean average precision by orders of magnitude on a large number of word queries.

FIG. 2 is an example diagram illustrating the primary operational components of a sense-preserving textual encoding and embedding computing system in accordance with one illustrative embodiment. FIG. 2 represents the primary operational components as blocks in a block diagram, where each block may be implemented as computer logic embodied in specialized hardware, software executed on computer hardware to thereby specifically configure the hardware to perform the operations attributed to the block, or any combination of specialized hardware and software executed on computer hardware. It should be appreciated that the components shown in FIG. 2 may be part of one or more computing systems which may be local or remote to one another, where remote computing systems may have data communication connections via one or more wired and/or wireless computer networks. Moreover, while the primary operational components are shown in FIG. 2 which facilitate the description of the novel elements of the illustrative embodiments, it should be appreciated that the computing systems with which these primary operational components are implemented will have other software, firmware, hardware, peripheral devices, user interface devices, and the like, with which the primary operational components may operate so as to achieve the functionalities of primary operational components as described herein. For example, operating systems, libraries, data structures, and the like may be provided to facilitate the operations of the primary operational components.

As shown in FIG. 2, the sense-preserving textual encoding and embedding computing system 200, hereafter referred to simply as the embedding system 200, includes a vocabulary interface 210, a word preparation engine 220, a similarity list formation engine 230, an encoder-decoder network 240, and a contrastive machine learning engine 250. The vocabulary interface 210 provides a data communication mechanism for accessing one or more ontology data structures for one or more selected vocabularies or thesauruses, such as a WordNet vocabulary, or the like. Through the vocabulary interface 210, the embedding system 200 is able to access the ontologies to obtain information specifying recognized words, parts of speech of each word, and synonyms, or lemmas, for each word. The word preparation engine 220 provides mechanisms for augmenting the data retrieved from the ontologies with sense information 23 through a novel word embedding utilized by the illustrative embodiments. This embedding is used to cluster words and generate similarity lists through the similarity list formation engine 230. The similarity lists, or clusters of similar words, generated by this process may then be used to generate batches of clusters or similarity lists that facilitate contrastive machine learning using a contrastive loss function and contrastive machine learning engine 250.

As noted above the illustrative embodiments implement a self-supervised contrastive learning approach to build a new word embedding by creating a new labeled similarity list dataset drawn from ontology data structures of a thesaurus or vocabulary, such as the Wordnet English language ontology. While Wordnet is used for the examples throughout this description, it should be appreciated that this is only an example of a vocabulary with corresponding ontology data structure(s) with which the illustrative embodiments may be utilized and the mechanisms of the illustrative embodiments may be used with any desired vocabulary and corresponding ontology data structures, presently known or later developed, in any desired spoken/written language, without departing from the spirit and scope of the present invention.

Consider an ordered sequence of a word vocabulary of size V. Each term/word in the vocabulary may consist of a single word, e.g., "mouse", or multiple words, e.g., "desert mouse", and the terms (or words) are lexicographically ordered. To capture meaning as well as sense, the illustrative embodiments adopt a complete specification of a word/term (hereafter referred to simply as a word) as:

$$W_i = <w_i; p_i; s_i; l_i> \qquad (1)$$

where these elements have the same meaning as previously described above, i.e., word name, part-of-speech (POS), sense, and lemma or synonym. For example, focusing only on nouns as an example, and Wordnet 3.0 using the NLTK library, there are 82,115 noun synsets (groupings of synonymous words that express the same concept) $w_i$ and 119,034 lemmas $l_i$ across all $w_i$. Similarly, the number of senses vary, e.g., in some illustrative embodiments ranging between 1 and 31, with the word "head" having the highest number of senses at 31.

The word preparation engine 220 operates on the one or more ontology data structures of a selected vocabulary accessed via the vocabulary interface 210, to augment the representation of the words specified in the ontology data structure(s) to have the above specification in equation (1). The vocabulary and its corresponding ontology data structure(s) may be vocabularies designed for general use, such as Wordnet as an example, or vocabularies designed for specific domains, e.g., the medical domain, financial domain, or the like. The mechanisms of the illustrative embodiments operate independent of the particular vocabulary selected, as long as a similarity list(s) may be extracted from the vocabulary. For new vocabularies, mapping to a known vocabulary may be performed prior to, or as part of, the operations of the word preparation engine 220 such that words in the new vocabulary are mapped to their closest match in the known vocabulary, e.g., Wordnet.

The word preparation engine 220 may traverse the ontology and parse and process the words in the ontology, e.g., Wordnet 3.0, using known natural language processing and ontology traversal algorithms. The word preparation engine 220 further comprises logic that takes the information for a word from the ontology and generates a representation of that word using equation (1) above, which includes adding a sense attribute to the word name, POS, and lemma attributes extracted from the ontology. The sense attribute may be identified through an automated process that evaluates the hierarchy of the word in the ontology to determine the sense associated with parent, child, and sibling words in a dependency tree of the ontology hierarchy corresponding to the current word, and generates a probability of the sense of the current word from the senses of the other words and weights given to the particular parent, child, and sibling words, where these weights may be dependent upon the distance between the current word and this parent, child, and sibling words. A neural network or other machine learning computer model is trained to receive input features comprising the senses of the parent, child, and sibling words, and their corresponding weights, and to recognize patterns in the input features representative of the probability of particular senses of the parent, child, and sibling words being applicable to the current word, and then output a vector specifying these probabilities and identifying a highest probability sense that may then be applied to the current word and used in the tuple representation of the word using equation (1) above.

Alternatively, the sense of a word in the ontology may be specified by the ontology itself. Thus, rather than performing an artificial intelligence based analysis of the ontology to derive the sense of the word, the sense may be extracted directly from the ontology specifying the sense of the word. In still other embodiments, if desired for the particular implementation, a manual process may be utilized in which a linguistic expert, or other subject matter expert (SME), may utilize the word preparation engine 220 to provide an interface for viewing the contents of the ontology data structure(s) of the vocabulary and edit or generate word representations using equation (1) above. For example, the word preparation engine 220 may provide a user interface through which the user may view words in the ontology data structure(s), information about these words, and dependency trees and the like in the hierarchy, of the words in the ontology data structure(s). User interface elements may be provided for modifying or generating a word representation for each of the words in accordance with equation (1) above, with the SME providing user input to specify the sense of the current word. The sense may be specified by the SME through any suitable mechanism for the implementation including a free form textual entry, a selection from a pre-populated list of recognized senses, or the like.

However, whether or not the sense is specifically given in the ontology, is derived from an analysis of the ontology, or is manually specified, the sense may be included in the embedding of the word, such as shown in equation (1) above, to form a neuronal embedding that captures the meaning/sense into a numeric formulation in a distance space, allowing it to be used in a computational manner for downstream processing, such as processing by a neural network or other algorithms. For example, the representation of a word as a 4 tuple, such as shown in equation (1) above, allows a machine learning model, such as a neural network, to learn the meaning and sense of the word natively. To illustrate, suppose one had just used the same target word "capsule" and paired it with multiple similarity lists, each corresponding to a respective meaning or sense of the word. This would confuse the machine learning model or neural network during learning since the machine learning model or neural network is basically a function approximator, and such multiple similarity lists per same target word ("capsule") do not define a function (note that a function in mathematics is a mapping in which a single source cannot map to multiple destinations). By allowing a detailed specification in a 4 tuple, and performing machine learning taking into account all parts of the 4 tuple, a unique mapping of a term, or multi-word term, to its corresponding similarity lists is created, turning such pairs into valid functional mappings for a machine learning model, e.g., neural network, to learn from.

Whether generated automatically or through a manual process, the resulting word representation is added to the ontology data structure as a characteristic of the word and is used to perform other operations of the embedding system 200 including generation of similarity lists and performing contrastive machine learning using the similarity lists. Thus, a set of words in the one or more ontologies of the selected vocabulary are represented using equation (1) above, where each of these words in the set have a word name, a part-of-speech, a sense, and a lemma or synonym attribute. It should be appreciated that this set of words may be all of the words in the one or more ontologies, or a selected subset of words in the ontologies. In the case of a selected subset of words in the ontologies, the operations for performing similarity list generation and contrastive machine learning may be performed with only the subset of words, e.g., only the nouns, only the multi-word terms, or the like, in the ontology data structure(s).

With regard to generating a similarity list for words in the one or more ontology data structures of the selected vocabulary, the similarity list formation engine 230 may navigate the ontology hierarchy, using the 4-tuple representation of words discussed above with regard to equation (1), and generate a list of candidate words that are within k depth levels of each other and are in the relationship of synonyms (lemmas), hypernyms, or hyponyms within the same part of speech and sense for each word, e.g., each synset in Wordnet. Various interfaces for obtaining the information regarding synonyms, hypernyms, hyponyms, and words at k depth levels from the ontology data structures may be utilized. For example, the NLTK library of the Wordnet ontology provides interfaces for accessing this information from the Wordnet ontology. The similarity list formation engine 230 processes this retrieved information, i.e., the 4-tuples of the words in the vocabulary, or subset of the vocabulary, to evaluate the information and generate the raw similarity lists based on the retrieved information. The raw similarity lists may then be filtered or ranked using a similarity metric, such as the Wu-Palmer (WUP) similarity metric, a Word2Vec similarity score, or the like, and a given threshold specifying a minimum level of similarity metric/score to indicate similar words, e.g., a threshold of 0.8 for the similarity metric/score. As an example, the Wu-Palmer (WUP) similarity metric is given as:

$$sim(W_i, W_j) = \frac{2 * d(lcs(W_i, W_j))}{d(W_i) + d(W_j)} \qquad (2)$$

where $lcs(W_i, W_j)$ is the least common ancestor of the synsets (words) $W_i$ and $W_j$, and d is the depth of the concept in the ontology. The Wu-Palmer (WUP) metric captures how similar the word senses are and where the synsets (words) occur relative to each other in the hypernym tree of the ontology. However, without a constraint on the depth differential (e.g., 2 in an example case), and a reasonably high threshold, the similarity score alone can reveal several false positives in association and lead to undesirable wider expansion of meanings, particularly for words closer to the root of the vocabulary's ontology hierarchy. For example, with a 4 level depth differential for a word such as "chair.n.05.chair", using the word representation of the illustrative embodiments, the Wu-Palmer similarity metric with regard to the word "device.n.01.device" is high (0.823) which is not the usual expectation for words similar to chair, even though the 5th sense of chair points to a means of support in WordNet.

Using the Wu-Palmer metric as an example, a similarity list can be assembled for each anchor sysnet (word) $W_i$ of a vocabulary V as $S_i=\{W_j|W_j\in V, sim(W_i,W_j)\geq T$ for threshold T. The similarity lists obtained for each word vary in size from 1 to a maximum size for the implementation, such as a maximum size of 4,798 for the word "genus.n.02.genus" in one implementation. The majority of the similarity lists, e.g., 88% in one implementation, have similarity lists of size 10 or less, i.e., 10 similar words or less, with the average size being 8.14 in one implementation. Note that due to the hypernyms and hyponyms being present in the similarity lists, these similarity lists are not necessarily symmetrical and cannot be recursively merged to form larger groups without diluting the underlying semantics.

The similarity lists for all words in WordNet may be assembled by the similarity list formation engine 230 and provided to linguistic experts or other SMEs for curation. FIG. 3 illustrates similarity lists or sets generated from this curation process for a small subset of words in noun form. As can be seen from FIG. 3, all relevant synonyms and closely related concepts are well modeled in each sense of the word. The last two rows show two different senses of the word "van" which correspond to distinct similarity lists which can now be incorporated in the embedding.

Using the above operations, while it can be learned which words are similar to one another, this alone is insufficient to allow a numeric formulation of the textual data as needed in machine learning for many downstream uses. To the contrary, an embedding is needed, and is learned by the training of the encoder-decoder network 240, that captures the essence of these similarity lists. The embedding learned by the encoder-decoder network of the illustrative embodiments pulls together all members of the similarity list of an anchor word (or synset) as positive samples and pushes apart the other words in the vocabulary as negative examples using a contrastive loss function designed for this purpose.

To illustrate this contrastive loss function, consider a fully-specified 4-tuple (as in equation (1) above) represented anchor word $W_i$ that is encoded by a 1-hot encoding $I_i \in E\{0, 1\}^{|V|}$, such that $\Sigma_{i=1}^{|V|} I_{ij}=1$ as an input to the encoder-decoder network 240. As a supervision label, a binary label vector is formed as $Y_i=\{0, 1\}^{|V|}$, such that $Y_{ij}=1$ iff $W_j \in S_i$ and 0 otherwise, and $\Sigma_{j=1}^{|V|} Y_{ij}1=|S_i|$. That is, a binary label vector is formed in which there is a value of 1 for members of the similarity list and a value of 0 for those outside the similarity lists, and thus, there is a total number of 1's in the binary pattern equal to the size of the similarity list. Thus, each similarity list is characterized by a unique binary pattern label vector. These similarity lists are then used to train the encoder-decoder network to perform an embedding of textual inputs.

FIG. 4 is an example diagram of the encoder-decoder network 240 in accordance with one illustrative embodiment. As shown in FIG. 4, the encoder-decoder network 240 includes a contrastive encoder 410, or simply "encoder" 410, as a dense fully connected layer with ReLU activation and a decoder/projection network 420 as another fully connected layer with ReLU activation. The encoder-decoder network 240 receives, during training, an input comprising a batch 402 of similarity lists per anchor word 403 and negative samples 404, as discussed herein. The vector inputs for the similarity lists and negative samples may be provided as 1-hot vector inputs. The negative samples 404 may be the similarity lists of other anchor words, or simply all other words in the ontology data structure(s) that are not part of the similarity lists 403. The encoder-decoder network 240 is trained to learn to separate the positive samples, i.e., words in the similarity lists for a given anchor word, from the negative samples, i.e., the words that are not in the similarity lists for the given anchor word. The encoder-decoder network 240 generates, as an output, a similarity cluster label vector 408.

The encoder-decoder network 240 is trying to learn the similarity function that relates a word to its similarity list in a computational way. In other words, it projects the input word (which is a 1-hot vector of size equal to the vocabulary, which for Wordnet nouns is a 142,989 size vector with only one element being 1 and the rest 0) into a new embedding space in which it is represented by a smaller size vector (e.g., approximately having a size of 300 for the embedding) that has numeric values for all elements instead of the 1-hot vector as input. What should go into that 300 element vector is controlled by what words are similar to the target word (i.e., its similarity list) and what words are not similar to the target word (the rest of the words in the ontology data structure(s)). The encoder-decoder network 240 is essentially trying to learn this mapping from 1-hot vector to the embedding vector. The labels provide the supervision and the contrastive loss which serves as the error metric to make the embedding as good as possible such that when it is used to compare two embedding vectors, they reflect distances in meaning and sense. After training, the decoder, or the projection head, 420 is no longer utilized since the purpose of the decoder 420 is to train the encoder 410 to perform this learned embedding. Thus, the end result is to generate a numeric embedding vector for each word/term the ontology data structure which can be used subsequently by machine learning computer models, such as neural networks and the like, which operate on natural language content.

During training of the encoder-decoder network 240, the encoder 410 maps the one-hot encoding $I_i$ to a representation vector normalized to unit hypersphere, and the decoder/projection network 420 renders the output $z_i$ to match the expected binary pattern vector $Y_i$. FIG. 4 illustrates the design of the encoder-decoder network 240 with an example of learning the embedding for the word "house.n.01" which is the first sense of the noun "house" indicating "bungalow, cottage, etc." The similarity between an anchor word $W_i$ at index i in the ordered vocabulary V, and a candidate word $W_{ji}$, that originates from the same similarity list $S_i$ at index j in the ordered vocabulary V, can be captured by the contrastive loss per similarity list as follows:

$$L_{contrast}(S_i) = \sum_{w_j \in S_i} \log \frac{\exp\left(z_i \cdot \frac{z_j}{\tau}\right)}{\sum_{a \in A(i)} \exp\left(z_i \cdot \frac{z_a}{\tau}\right)} \quad (3)$$

where $z_i$ is the projected vector for word $W_i$ and $z_j$ is the projected vector similarly for word Wei. Finally, $z_a$ is the projected vector for any word $W_a$ either inside or outside the similarity list, which may be the entire vocabulary. In general, since the similarity lists are small in size, the number of negative samples to differentiate them need not take up the entire vocabulary V, so smaller batch sizes can be used. The value τ is the temperature, which is a parameter that controls the machine learning, to weight the contribution from similar vectors.

Since there are multiple similarity lists for a given vocabulary or subset of the vocabulary, e.g., at least one for each vocabulary word or word in the subset of words represented by the 4-tuple discussed above, the network 240 can be trained on these different similarity lists for different words in a sequential fashion through batching using a cumulative contrastive loss function as:

$$L_{contrast} = \sum_{j}^{|V|} L_{constrast}(S_j) \quad (4)$$

Ordinarily, this pairwise comparison operation in contrastive loss would be excessively large both in number of pairwise comparisons and in required memory size to perform the operations. For example, even by restricting the operations to only the nouns in the vocabulary with their similarity lists, using Wordnet again as an example, there is a 100,000×100,000 tensor input to the encoder-decoder network 240. Fortunately, since the input is a very sparse tensor (only one non-zero element per row), an intelligent batching operation can minimize the training time for the encoder-decoder network 240 and minimize the amount of memory, and memory management operations, required to accomplish the training. Specifically, for a batch size of M, one may enlist similarity lists which are disjoint in members and whose sizes together fit inside a batch to train the encoder-decoder network 240 on the batch, e.g., if M is 20, and similarity list 1 has a size of 6, similarity list 2 has a size of 8, and similarity list 3 has a size of 6, then all three similarity lists may be part of the same batch since their sizes are within the maximum size of M.

In some illustrative embodiments, to ensure there are sufficient number of negative samples for each similarity list, where again negative samples are words in the vocabulary or ontology that are not part of the similarity list, at least half of each batch is reserved for positive samples from the similarity lists and the remaining negative samples come from other words outside those that are part of the similarity lists in the reserved portion of the batch. The contrastive machine learning engine 250 divides the words in the vocabulary into multiple batches such that each similarity list generated by the similarity list formation engine 230, and its anchor word, are in at least one batch run during training of the encoder-decoder network 240. The encoder-decoder network 240 is then executed on each of the generated batches, each of which have a different binary pattern, to thereby learn a similarity embedding from the similarity lists, where this similarity embedding natively incorporates distances that reflect distances in meaning, and where this training is governed by the contrastive machine learning engine 250 which applies the contrastive loss function discussed above to determine the loss and adjust operational parameters of the encoder-decoder network 240, e.g., weights of nodes, in accordance with the determined contrastive loss function so as to minimize this contrastive loss function until either an acceptable level of loss is achieved (i.e., loss is equal to or less than a predetermined threshold), or a predetermined number of epochs of training have been completed.

Each similarity list, upon which the batches are generated, and the machine learning training is performed, represents a neighborhood in the embedding space where this neighborhood is comprised of words that are similar to one another and dissimilar from other words in the ontology or vocabulary, as determined based on at least the 4-tuple word representation discussed above that takes into account part-of-speech, sense, and synonyms (lemmas). Since there are a large number of words, and batches reflecting different binary patterns, the vocabulary's similarity lists provide sufficient self-supervision for training the encoder-decoder network 240 on the vocabulary to identify similarity embeddings without needing a large text corpus or corpora.

Figure 5:
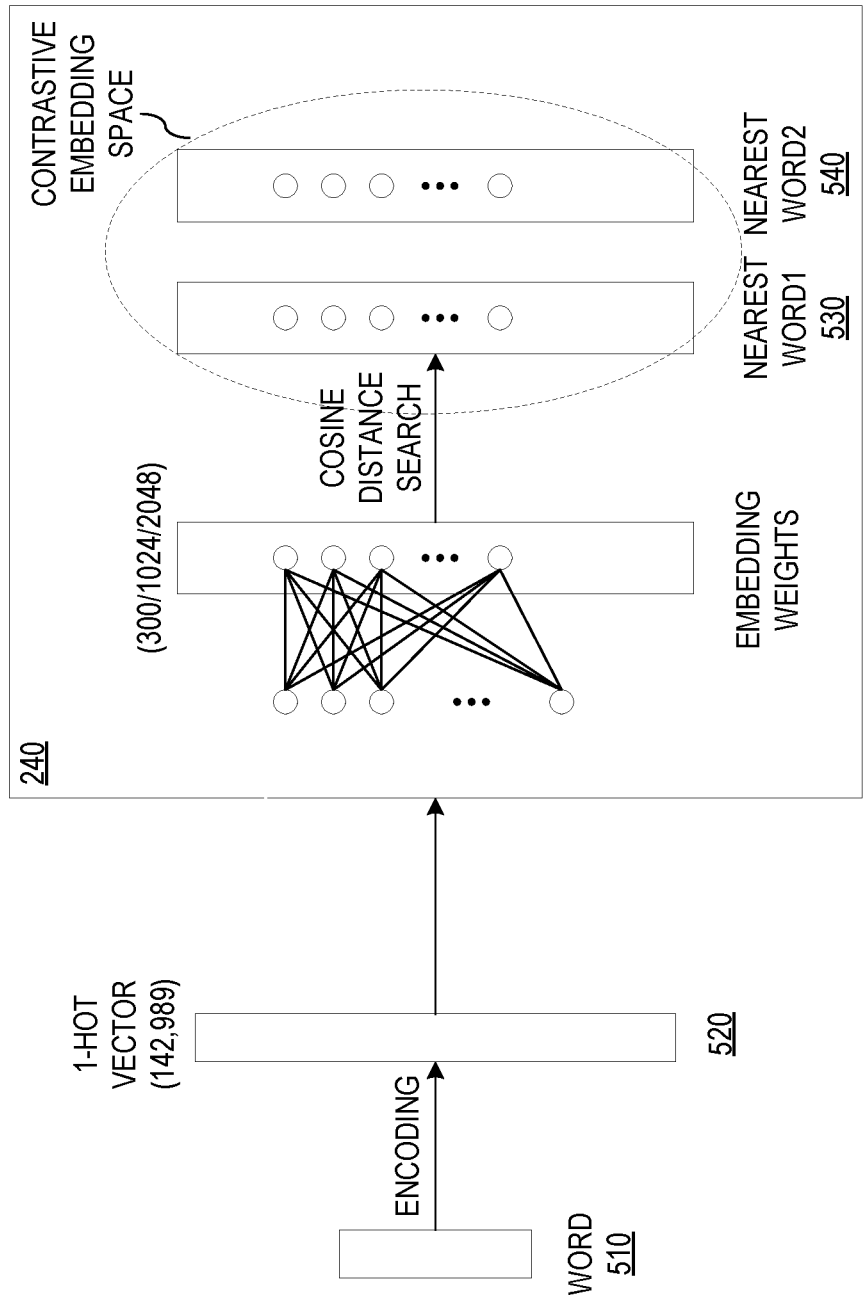
FIG. 5 is an example diagram of a trained encoder-decoder network operating to perform an inference operation on an input word in accordance with one illustrative embodiment.

Once the encoder-decoder network 240 is trained through the execution of machine learning training on each of the batches by the contrastive machine learning engine 250, the trained encoder-decoder network 240 may then be applied to new input words to generate an output specifying similar words with regard to part-of-speech, sense, and meaning. That is, as shown in FIG. 5, during inference, or runtime, operation, the trained encoder-decoder network 240, which now only utilizes the trained encoder, receives a word 510 that is encoded as a 1-hot vector 520 as input. The trained encoder-decoder network 240 generates an output of the nearest words 530, 540 in the contrastive embedding space using the similarity embeddings learned by the trained encoder-decoder network 240 as a weighting mechanism for weighting words in the vocabulary when performing a cosine distance search on the similarity embeddings of the words in the vocabulary.

Thus, each term in the vocabulary ontology data structure(s) is mapped to an embedding by the machine learning process described above. Thus, there is an embedding vector that corresponds to each term/word. Since the embedding is a vector space, the trained encoder can search for a nearest vector either using a distance evaluation, such as using Euclidean distance or cosine distance, for example. The cosine distance, for example, which measures the angle of separation of two vectors, may be used for nearest neighbor searches. Thus, when a query term or word 510 is input, then either the term/word 510 is already in the vocabulary or it can be derived by piecing together words in the vocabulary. In the former case, the embedding performed by the trained encoder may be used to compute the distance between its embedding vectors and all other embedding vectors corresponding to the entire vocabulary. The top K closest vectors may then be returned as matches. Assuming the embedding is performed correctly, then these nearest embedding vectors should correspond to the nearest in meaning/sense words.

For the latter case where the term/word 510 is not in the vocabulary, a pseudo-embedding vector can be generated by breaking the query term/word 510 into terms that have known embedding vectors in the vocabulary and averaging them. The averaging process generates a vector that is in-between the angle spanned by the embedding vectors corresponding to the constituent query words/terms that are furthest from each other. Once this pseudo embedding is generated, a search for the nearest embedding vectors corresponding to other term/words that are similar to this pseudo embedding may be perform in a manner similar to that described above using, for example, Euclidean or cosine distance functions.

Although the embedding system 200 may operate on similarity lists for each part of speech, the illustrative embodiments and empirical results obtained are described herein with regard words that are specifically nouns in the vocabulary. It is readily apparent that the illustrative embodiment mechanisms may be applied to any words of any part-of-speech, sense, and the like. In one implementation of the illustrative embodiments, the word vocabulary size was selected as a vocabulary having 142,989 words, and there were 130,283 similarity lists. The encoder-decoder network 240 had an architecture with the following parameters: input and output vector sizes=142,989, encoding size=300, temperature=0.05. The performance varying batch sizes were tuned from 200 to 1000 words, and epochs for training the encoder-decoder network 240 were tuned from 5 to 50. Convergence per similarity list was usually achieved within 5 to 10 epochs. An optimizer was used for fast convergence with a learning rate as 0.001. Training took approximately 5 minutes per batch. The network overall had 85,936,689 parameters.

To illustrate the improved performance of the encoder-decoder network 240 trained through the similarity list based mechanisms and 4-tuple word representation mechanisms of the illustrative embodiments, consider a similarity retrieval operation for the same word queries "cloud" and "glass" as mentioned earlier. To produce a ranked list of similar words, a cosine distance was used on word vectors formed from the trained encoder-decoder network 240. First, it was observed that the results rank the matches to the sense and meaning of words higher and there is significant differentiation between the scores of similarity list members and other members, as is illustrated by the mean average precision (MAP) metrics shown in Table 2 below:

TABLE 2

Illustration of Comparative MAP performance of word embeddings

| Model | Embedding Size | Queries | MAP |
|---|---|---|---|
| Word2Vec | 300 | 35172 | 1.92% |
| Glove | 300 | 35172 | 2.46% |
| Present Invention | 300 | 35172 | 58.4% |

The MAP metric measures, on average, how often the matches to a query term/word, that are in the top K matches, are in fact similar in meaning and sense to the query term/word. Thus, the MAP metric implicitly captures the correctness of the match in terms of meaning and sense, with a higher MAP implying a better model performance.

Secondly, the trained encoder-decoder network 240 can be implemented with a method of retrieval based on a threshold on similarity rather than selecting a top K value for limiting the search results. That is, by training the encoder-decoder network 240 with similarity lists, if one examines the top K matches, a sharp decline in score is observed once the members of the similarity lists are not being returned as similarity results and non-similarity list words/terms are evaluated by the trained encoder-decoder network 240. This suggests that the sharp decline in confidence score, or similarity measure, may be used instead of a top-K approach, i.e., a threshold on the confidence score can be set to retain matches instead of selecting K matches all the time, since a low confidence score match in the top K lists is not really similar in meaning.

For example, for a query="visitor.n.01.visitant", the top 20 nearest neighbors are shown in the similarity listing below. Here one can see that the similarity rapidly drops off after 12 matches (from a score in the range of 0.8 to 1.0 to scores in the range of 0.22 to 0.26). Thus, a threshold that uses this sharp drop can be used to discontinue the nearest neighbor search rather than using a fixed top K of 20, for example.

Similarity List for "visitor.n.01.visitant":

| | | |
|---|---|---|
| 1. | visitor.n.01.visitant | 1.0 |
| 2. | visitor.n.01.visitor | 0.9513515 |
| 3. | caller.n.01.company | 0.91705084 |
| 4. | caller.n.01.caller | 0.8999634 |
| 5. | boulevardier.n.01.boulevardier | 0.882577 |
| 6. | guest.n.01.guest | 0.880547 |
| 7. | visiting_fireman.n.01.visiting_fireman | 0.8790859 |
| 8. | guest.n.01.invitee | 0.87762904 |
| 9. | house_guest.n.01.houseguest | 0.8267511 |
| 10. | wedding_guest.n.01.wedding_guest | 0.81799155 |
| 11. | house_guest.n.01.house_guest | 0.8014935 |
| 12. | guest_of_honor.n.01.guest_of_honor | 0.78232765 |
| 13. | coward.n.02.Coward | 0.26290974 |
| 14. | hypernatremia.n.01.hypernatremia | 0.23106459 |
| 15. | avitaminosis.n.01.avitaminosis | 0.22831102 |
| 16. | scintillating_scotoma.n.01.flittering_scotoma | 0.22632737 |
| 17. | glabella.n.01.glabella | 0.22513337 |
| 18. | retinal_detachment.n.01.detached_retina | 0.22332309 |
| 19. | nyctalopia.n.01.night_blindness | 0.22291943 |
| 20. | softy.n.01.softy | 0.22268282 |

Finally, it was observed that the matches to different senses of the word can all be retrieved if precise specification of the query as a 4-tuple from equation (1) is not possible. That is, if a query does not have the full specification as shown in the 4-tupe of equation (1), then the query may be automatically mapped to the nearest possible 4-tuple. If there are multiple nearest possible 4-tuples, all of these nearest possible 4-tuples may be utilized, each representing a different query, and matches of similar terms/words may be found separately for each sense of the word. This is different from other word embeddings where there is only one choice for a word selected, which often is the most common meaning of the word. For example, if the query term/word is "capsule", then the possible expansions of capsule as a noun is in a few senses: "capsule.n.01.capsule", "capsule.n.02.capsule", "capsule.n.03.capsule"., "capsule.n.05.capsule". The illustrative embodiments will therefore, provide 4 possible similarity lists, such as:

Similarity List 1:

| | | |
|---|---|---|
| 1. | capsule.n.01.capsule | 0.99999994 |
| 2. | paintball.n.01.paintball | 0.88523084 |
| 3. | container.n.01.container | 0.8090684 |
| 4. | savings_bank.n.02.bank | 0.74495155 |
| 5. | bag.n.04.handbag | 0.743345 |
| 6. | wastepaper_basket.n.01.waste_basket | 0.74229956 |
| 7. | savings_bank.n.02.savings_bank | 0.73620987 |
| 8. | savings_bank.n.02.money_box | 0.7346803 |
| 9. | savings_bank.n.02.coin_bank | 0.7314282 |
| 10. | wastepaper_basket.n.01.wastepaper_basket | 0.7308888 |
| 11. | scuttle.n.01.scuttle | 0.72855693 |
| 12. | wastepaper_basket.n.01.wastebasket | 0.72534096 |
| 13. | pod.n.04.pod | 0.7253297 |
| 14. | wastepaper_basket.n.01.waste-paper_basket | 0.72456586 |
| 15. | watering_can.n.01.watering_pot | 0.71784544 |
| 16. | case.n.20.display_case | 0.7177066 |
| 17. | grab_bag.n.02.grab_bag | 0.7174369 |
| 18. | scuttle.n.01.coal_scuttle | 0.71724975 |
| 19. | dice_cup.n.01.dice_cup | 0.7152838 |
| 20. | pod.n.04.fuel_pod | 0.7147507 |

Similarity List 2:

| | | |
|---|---|---|
| 1. | capsule.n.02.capsule | 1.0 |
| 2. | sleeping_pill.n.01.sleeping_capsule | 0.85357976 |
| 3. | pill.n.02.pill | 0.8519808 |
| 4. | sleeping_pill.n.01.sleeping_draught | 0.84885615 |
| 5. | pill.n.02.lozenge | 0.84745604 |

| | | |
|---|---|---|
| 6. | pill.n.02.tablet | 0.8385364 |
| 7. | pill.n.02.tab | 0.83713156 |
| 8. | sleeping_pill.n.01.sleeping_tablet | 0.82915324 |
| 9. | bolus.n.02.bolus | 0.82793623 |
| 10. | sleeping_pill.n.01.sleeping_pill | 0.82280993 |
| 11. | dragee.n.03.dragee | 0.8154106 |
| 12. | soporific.n.01.hypnotic | 0.7385532 |
| 13. | soporific.n.01.soporific | 0.72788286 |
| 14. | booster.n.06.recall_dose | 0.7113882 |
| 15. | booster.n.06.booster | 0.6971885 |
| 16. | booster.n.06.booster_shot | 0.6967567 |
| 17. | narcoleptic.n.02.narcoleptic | 0.6943735 |
| 18. | booster.n.06.booster_dose | 0.69321835 |
| 19. | dose.n.01.dose | 0.6876443 |
| 20. | hit.n.05.hit | 0.6459951 |

Similarity List 3:

| | | |
|---|---|---|
| 1. | capsule.n.03.capsule | 0.99999994 |
| 2. | pericarp.n.01.pericarp | 0.9179442 |
| 3. | boll.n.01.boll | 0.8961812 |
| 4. | pericarp.n.01.seed_vessel | 0.8742389 |
| 5. | bilocular_capsule.n.01.bilocular_capsule | 0.8593703 |
| 6. | stone.n.06.endocarp | 0.85796726 |
| 7. | stone.n.06.stone | 0.8531487 |
| 8. | stone.n.06.pit | 0.8499871 |
| 9. | mesocarp.n.01.mesocarp | 0.8453423 |
| 10. | epicarp.n.01.exocarp | 0.8447291 |
| 11. | bur.n.01.burr | 0.844543 |
| 12. | epicarp.n.01.epicarp | 0.84326786 |
| 13. | bur.n.01.bur | 0.8423968 |
| 14. | silique.n.01.silique | 0.8099123 |
| 15. | silique.n.01.siliqua | 0.8069979 |
| 16. | cherry_stone.n.01.cherry_stone | 0.8043803 |
| 17. | peach_pit.n.01.peach_pit | 0.8030505 |
| 18. | spanish_needles.n.01.Spanish_needles | 0.7875665 |
| 19. | spanish_needles.n.01.beggar-ticks | 0.7565153 |
| 20. | covering.n.01.cover | 0.75460964 |

Similarity List 4:

| | | |
|---|---|---|
| 1. | capsule.n.05.capsule | 1.0 |
| 2. | eyeball.n.01.orb | 0.90167016 |
| 3. | eyeball.n.01.eyeball | 0.8998242 |
| 4. | structure.n.04.complex_body_part | 0.88835686 |
| 5. | structure.n.04.structure | 0.8863708 |
| 6. | structure.n.04.anatomical_structure | 0.8815662 |
| 7. | structure.n.04.body_structure | 0.87364906 |
| 8. | structure.n.04.bodily_structure | 0.8704073 |
| 9. | malpighian_body.n.01.renal_corpuscle | 0.8640958 |
| 10. | malpighian_body.n.01.malpighian_corpuscle | 0.86016965 |
| 11. | limbus.n.01.limbus | 0.84701234 |
| 12. | filament.n.03.filament | 0.84639126 |
| 13. | nucleolus_organizer.n.01.nucleolar_organiser | 0.84555566 |
| 14. | nucleolus_organizer.n.01.nucleolus_organiser | 0.8455318 |
| 15. | zone.n.04.zona | 0.8447429 |
| 16. | gill_arch.n.01.branchial_arch | 0.844357 |
| 17. | syrinx.n.02.syrinx | 0.8419162 |
| 18. | radicle.n.01.radicle | 0.8418499 |
| 19. | head.n.25.head | 0.8417953 |
| 20. | rotator_cuff.n.01.rotator_cuff | 0.8412341 |

Since the vocabulary is known using this 4-tuple notation, the process of finding these expansions searches for the query terms/words within the lemma portion of the 4-tuple representation. Overall, it can be seen from sample results that the quality of retrieval of matches show good examples of synonyms as well as hierarchical abstractions making them more meaningful for similarity retrieval.

For a quantitative comparison, two popular embedding mechanisms were adopted, namely, Word2Vec 300 dimensional word vectors and the GloVe 300-dimensional word vectors. Since the vocabularies used for training these models, and the encoder-decoder network 240 of the illustrative embodiments, have collections of words that are overlapping but not identical vocabulary sets, a dataset of 35,172 words that were common to all vocabularies was used. These words were selected to have non-overlapping similarity lists of sizes representative of the average size of similarity lists. For each query term/word from this common dataset, all words in the respective vocabulary were ranked and all those that were not in the common dataset were filtered out. The position of each of the members of the similarity lists for a query term/word were then determined to calculate the average precision. The final numbers across all the queries were averaged to compute the mean average precision (MAP). The resulting mean average precision (MAP) for the three different computer models is shown above in Table 2.

As can be seen from Table 2, the matches returned by the two popular embeddings show a surprisingly low MAP score, possibly indicating that the words similar in meaning from the vocabulary, e.g., Wordnet, are not actually present in similar use contexts. Finally, it can be seen that the illustrative embodiments of the present invention, implementing the similarity embedding learned by the encoder-decoder network 240 of the illustrative embodiments, significantly outperforms these other embedding models in terms of mean average precision (MAP).

Thus, the illustrative embodiments provide an improved computing tool and improved computing tool operation that uses a novel word representation that is used to generate similarity lists for anchor words which are then used to train an encoder-decoder network 240 to learn a novel word embedding that inherently captures the semantics and senses of the words using a self-supervised contrastive learning approach. The resulting similarity embedding can be used for downstream applications for more meaningful and accurate results since the embedding will generate results that more accurately reflect the sense of the query terms/words.

Figure 6A:
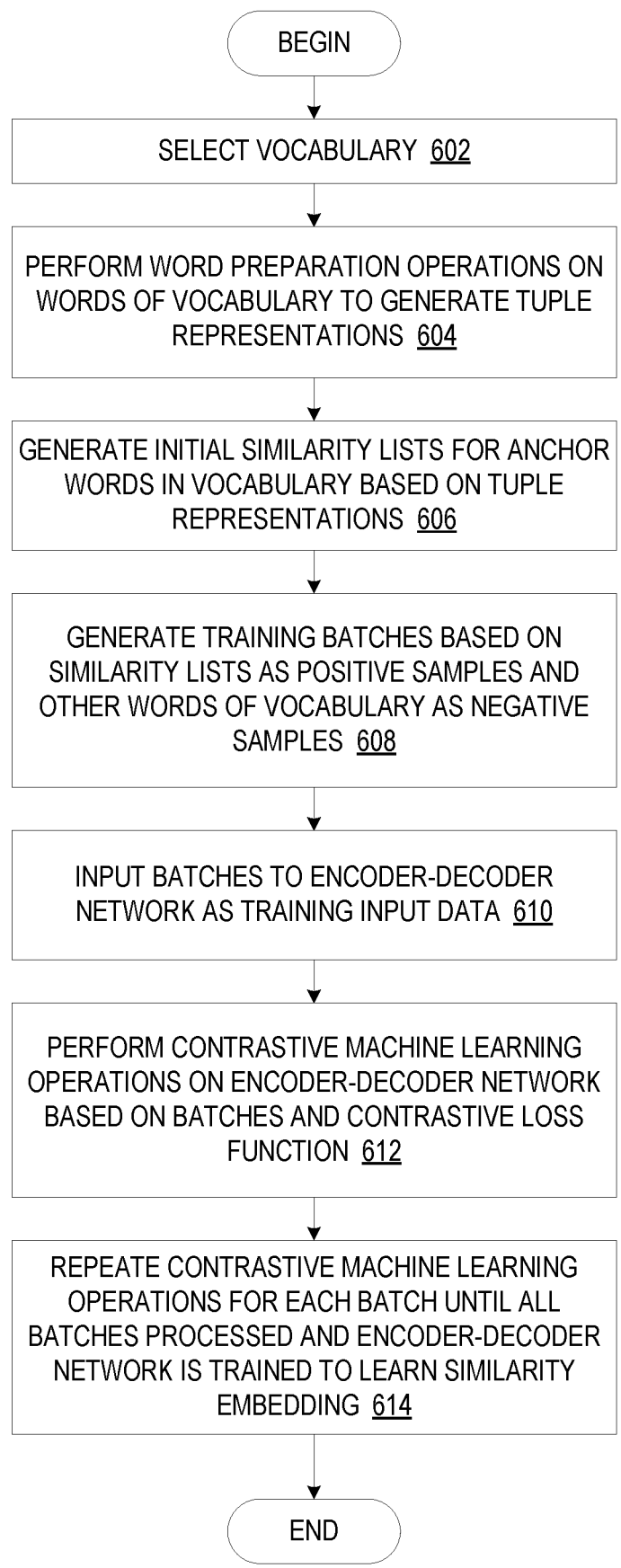
FIG. 6A is a flowchart outlining an example operation for training an encoder-decoder network in accordance with one illustrative embodiment.

FIG. 6A is a flowchart outlining an example operation for training an encoder-decoder network in accordance with one illustrative embodiment. As shown in FIG. 6A, the operation starts by selecting a vocabulary, or one or more ontology data structures, upon which the encoder-decoder network is to be trained using an unsupervised contrastive machine learning operation, such as previously described above (step 602). The words in the vocabulary are then subjected to a word preparation operation which represents each of the words as a separate tuple data structure in which the sense of the word is specified as one of the attributes or characteristics of the word (step 604). For example, each word may be represented by a 4-tuple data structure such as described previously with regard to equation (1) above, e.g., $W_i = <w_i, p_i, s_i, l_i>$ for i=1 to N where N is the size of the vocabulary, or the subset of the vocabulary that is being used to train the encoder-decoder network.

Having represented each word in the vocabulary with the tuple data structure, initial similarity lists for each anchor word in the vocabulary are generated based on these tuple data structures and a similarity measure calculated based on the ontology of the vocabulary (step 606). The similarity measure may be calculated with regard to the combination of attributes specified in the tuple data structure so that words similar in part-of-speech, sense, and meaning (such as may be indicated by the synonym or lemma), have relatively higher similarity measures. The similarity measures are used to cluster the words into similarity lists that represent neighborhoods within the embedding space.

The similarity lists generated are then used to generate training batches based on the size of the similarity lists and the maximum size of the training batches (step 608). The training batches comprise similarity lists whose combined sizes fit within the maximum size of the training batches, along with negative samples that are words from the vocabulary that are not represented in the similarity lists of the batch. The batches of similarity lists and negative samples are input to the encoder-decoder network as training input (step 610) which processes the inputs to generate an output vector representing the predicted similarity labels for the inputs. A contrastive machine learning operation is performed on the encoder-decoder network for each batch (step 612) where this contrastive machine learning operation utilizes a contrastive loss function as previously described above. Each training operation for each batch may be performed iteratively with adjustments of the operational parameters of the encoder-decoder network to reduce the contrastive loss function until an acceptable level of loss is reached (convergence) or a predetermined number of epochs are reached. This process may be repeated for each batch such that the encoder-decoder network is trained across all batches and learns a similarity embedding based on the similarity lists and negative examples of each batch (step 614). The operation then terminates.

Figure 6B:
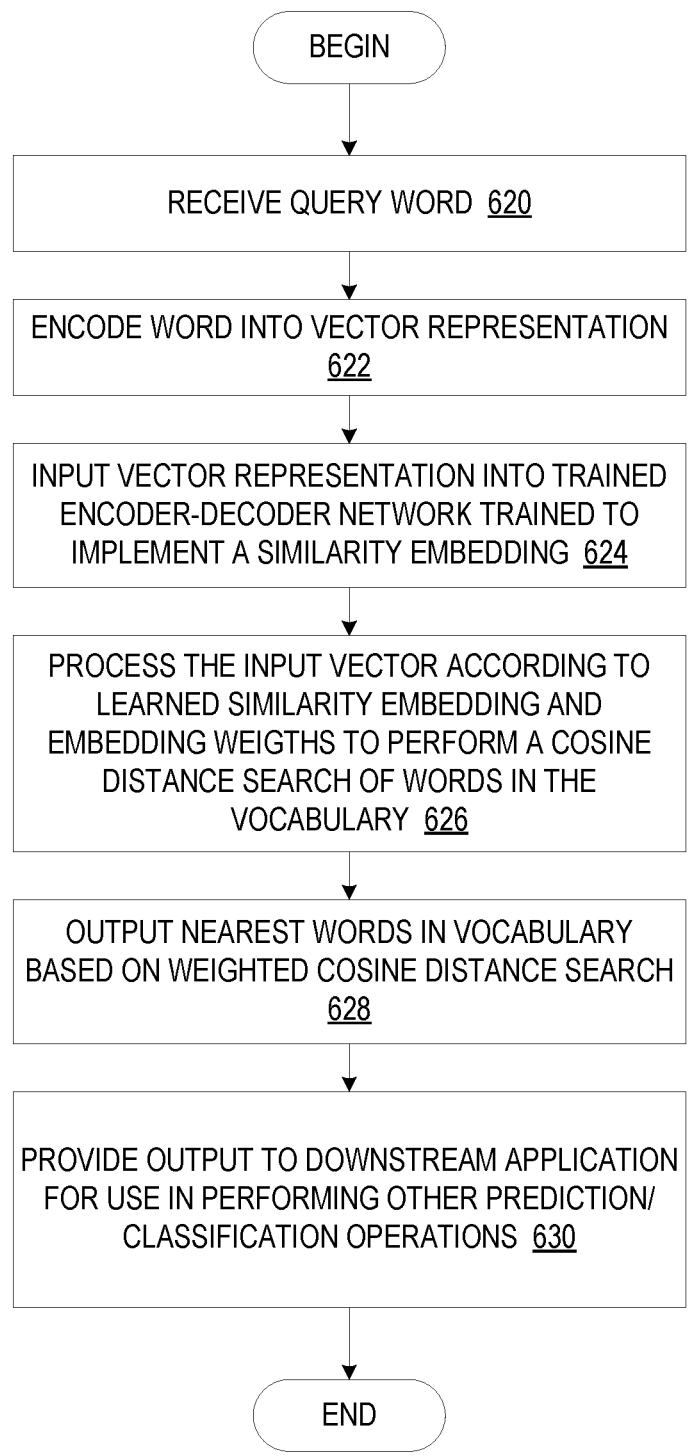
FIG. 6B is a flowchart outlining an example operation for performing an inference operation using a trained encoder-decoder network in accordance with one illustrative embodiment.

FIG. 6B is a flowchart outlining an example operation for performing an inference operation using a trained encoder-decoder network in accordance with one illustrative embodiment. As shown in FIG. 6B, the operation starts with the receipt of a word for which similar words are to be identified in a vocabulary (step 620). The word is encoded into a vector representation, e.g., 1-hot vector representation (step 622) and input to the trained encoder-decoder network (step 624). The trained encoder-decoder network processes the vector representation in accordance with the learned similarity embedding which provides embedding weights to a cosine distance search of the words in the vocabulary (step 626). The encoder-decoder network then outputs the nearest words in the contrastive embedding space based on a ranking of probability values associated with each word in the vocabulary (step 628). This output may be provided to other downstream applications and/or computing devices for performance of additional operations based on the similarity of words in the vocabulary (step 630). For example, the output of the trained encoder-decoder network 240 may be used to provide input for evaluating image labels as part of an image recognition operation performed by a downstream application and/or computing system. The operation then terminates.

Figure 7:
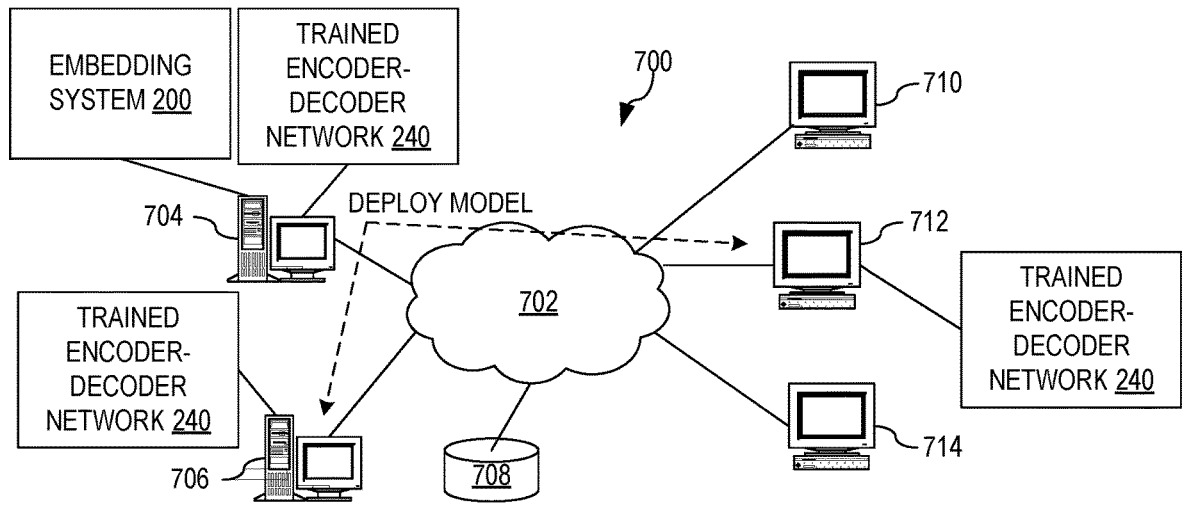
FIG. 7 is an example diagram of a distributed data processing system in which aspects of the illustrative embodiments may be implemented.
Figure 8:
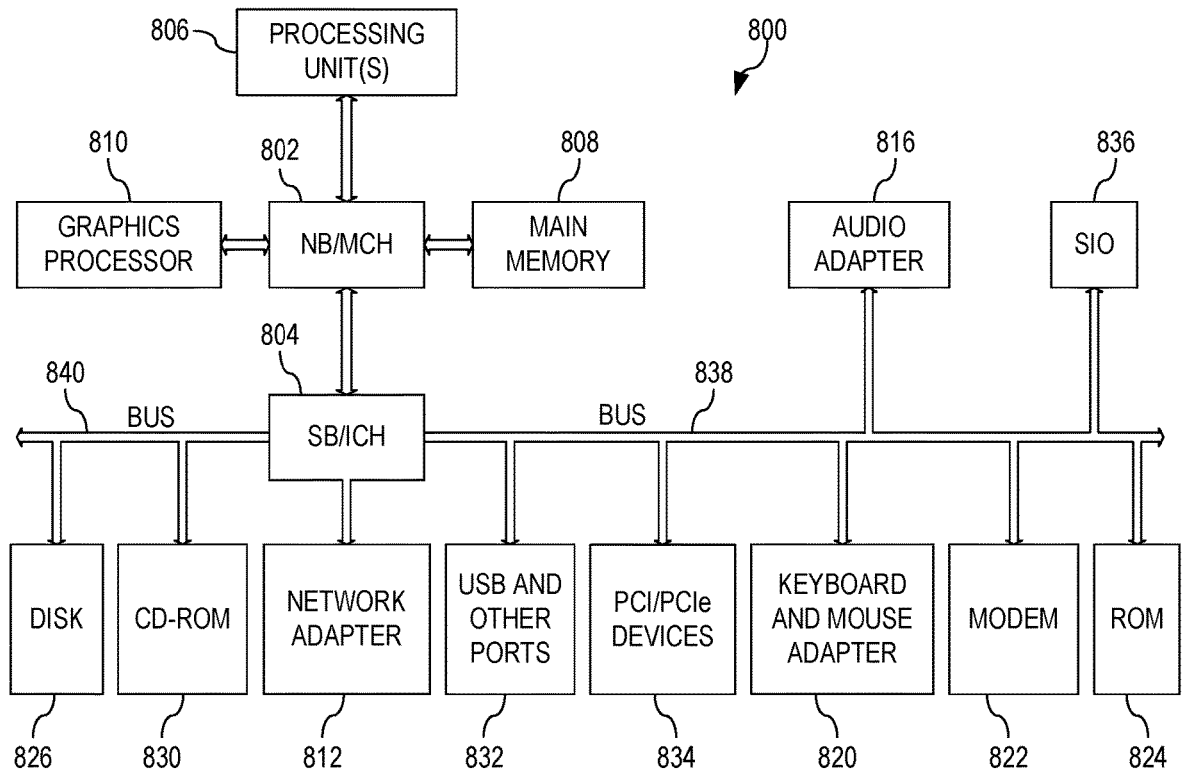
FIG. 8 is an example block diagram of a computing device in which aspects of the illustrative embodiments may be implemented.

It is apparent from the above description that the illustrative embodiments are specifically directed to an improved computing tool and improved computing tool operation that may be implemented in various types of data processing environments. FIGS. 7 and 8 are provided hereafter as example environments in which aspects of the illustrative embodiments may be implemented. It should be appreciated that FIGS. 7 and 8 are only examples and are not intended to assert or imply any limitation with regard to the environments in which aspects or embodiments of the present invention may be implemented. Many modifications to the depicted environments may be made without departing from the spirit and scope of the present invention.

FIG. 7 depicts a pictorial representation of an example distributed data processing system in which aspects of the illustrative embodiments may be implemented. Distributed data processing system 700 may include a network of computers in which aspects of the illustrative embodiments may be implemented. The distributed data processing system 700 contains at least one network 702, which is the medium used to provide communication links between various devices and computers connected together within distributed data processing system 700. The network 702 may include connections, such as wire, wireless communication links, or fiber optic cables.

In the depicted example, server 704 and server 706 are connected to network 702 along with storage unit 708. In addition, clients 710, 712, and 714 are also connected to network 702. These clients 710, 712, and 714 may be, for example, personal computers, network computers, or the like. In the depicted example, server 704 provides data, such as boot files, operating system images, and applications to the clients 710, 712, and 714. Clients 710, 712, and 714 are clients to server 704 in the depicted example. Distributed data processing system 700 may include additional servers, clients, and other devices not shown.

In the depicted example, distributed data processing system 700 is the Internet with network 702 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 700 may also be implemented to include a number of different types of networks, such as for example, an intranet, a local area network (LAN), a wide area network (WAN), or the like. As stated above, FIG. 7 is intended as an example, not as an architectural limitation for different embodiments of the present invention, and therefore, the particular elements shown in FIG. 7 should not be considered limiting with regard to the environments in which the illustrative embodiments of the present invention may be implemented.

As shown in FIG. 7, one or more of the computing devices, e.g., server 704, may be specifically configured to implement an embedding system, such as the embedding system 200 in FIG. 2, which implements the word representations, similarity lists, similarity list based unsupervised contrastive machine learning mechanisms, and the encoder-decoder network that is trained through this unsupervised contrastive machine learning to generate a trained encoder-decoder network that may operate in the configured computing device to perform inferences with regard to similarity of query words and words in a vocabulary, and/or may be deployed as instances on other computing systems for implementation with those computing systems to perform such inference operations. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 704, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein above, the implementation of the mechanisms of the illustrative embodiments improves the functionality of the computing device and provides a useful and concrete result that facilitates improved performance, such as represented by the mean average precision metrics discussed above, with regard to identifying similar words in a vocabulary to a query word. A computing device or system configured with the embedding system 200 and/or the deployed trained encoder-decoder network 240 may operate in conjunction with other downstream applications to facilitate an artificial intelligence (AI) computing system or other cognitive computing system that performs complex evaluations of input data to identify patterns within the input data and generate predictions or classifications based on these identified patterns. For example, in one illustrative embodiment, the downstream application or computing system may operate to perform image analysis and labeling of objects present in the image where the similarity evaluation performed by the improved mechanisms of the illustrative embodiments may assist in the identification of labels for such objects. This is one example, but it should be appreciated that the mechanisms of the illustrative embodiments may be implemented with other types of AI computing systems, cognitive computing systems, natural language processing computing systems, or any other computing system that performs tasks where other word embeddings are utilized, such as any tasks for which other word embeddings such as GloVe or Word2Vec are utilized. For example, the mechanisms of the illustrative embodiments may be implemented as part of one or more computing systems to serve as:

(1) a basic embedding in constructing sentence transformer neural networks;
(2) a mechanism for similarity retrieval of textual content based on queries to reflect more semantic understanding of context;
(3) a mechanism for visual-textual class name similarity evaluation to retrieve images belonging to classes that are similar in meaning or that are semantically related;
(4) a mechanism in question answering computing systems, such as the IBM Watson™ cognitive computing system (available from International Business Machines Corporation of Armonk, New York), for an enhanced understanding of what the user is asking;
(5) a mechanism for assisting with sentiment analysis so as to understand positive or negative sentiments for content, products in e-commerce, or the like; and
(6) a mechanism for topic inference from a paragraph of text and for text categorization in natural language processing tasks.

It should be appreciated that these are only examples of possible implementations of the mechanisms of the illustrative embodiments and other implementations will become readily apparent to those of ordinary skill in the art in view of the present description, and are intended to be within the spirit and scope of the present invention.

As noted above, the mechanisms of the illustrative embodiments utilize specifically configured computing devices, or data processing systems, to perform the operations for performing textual encoding that preserves the meaning and sense of the original text. These computing devices, or data processing systems, may comprise various hardware elements which are specifically configured, either through hardware configuration, software configuration, or a combination of hardware and software configuration, to implement one or more of the systems/subsystems described herein. FIG. 8 is a block diagram of just one example data processing system in which aspects of the illustrative embodiments may be implemented. Data processing system 800 is an example of a computer, such as server 704 in FIG. 7, in which computer usable code or instructions implementing the processes and aspects of the illustrative embodiments of the present invention may be located and/or executed so as to achieve the operation, output, and external effects of the illustrative embodiments as described herein.

In the depicted example, data processing system 800 employs a hub architecture including north bridge and memory controller hub (NB/MCH) 802 and south bridge and input/output (I/O) controller hub (SB/ICH) 804. Processing unit 806, main memory 808, and graphics processor 810 are connected to NB/MCH 802. Graphics processor 810 may be connected to NB/MCH 802 through an accelerated graphics port (AGP).

In the depicted example, local area network (LAN) adapter 812 connects to SB/ICH 804. Audio adapter 816, keyboard and mouse adapter 820, modem 822, read only memory (ROM) 824, hard disk drive (HDD) 826, CD-ROM drive 830, universal serial bus (USB) ports and other communication ports 832, and PCI/PCIe devices 834 connect to SB/ICH 804 through bus 838 and bus 840. PCI/PCIe devices may include, for example, Ethernet adapters, add-in cards, and PC cards for notebook computers. PCI uses a card bus controller, while PCIe does not. ROM 824 may be, for example, a flash basic input/output system (BIOS).

HDD 826 and CD-ROM drive 830 connect to SB/ICH 804 through bus 840. HDD 826 and CD-ROM drive 830 may use, for example, an integrated drive electronics (IDE) or serial advanced technology attachment (SATA) interface. Super I/O (SIO) device 836 may be connected to SB/ICH 804.

An operating system runs on processing unit 806. The operating system coordinates and provides control of various components within the data processing system 800 in FIG. 8. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 800.

As a server, data processing system 800 may be, for example, an IBM eServer™ System p° computer system, Power™ processor based computer system, or the like, running the Advanced Interactive Executive (AIX®) operating system or the LINUX® operating system. Data processing system 800 may be a symmetric multiprocessor (SMP) system including a plurality of processors in processing unit 806. Alternatively, a single processor system may be employed.

Instructions for the operating system, the object-oriented programming system, and applications or programs are located on storage devices, such as HDD 826, and may be loaded into main memory 808 for execution by processing unit 806. The processes for illustrative embodiments of the present invention may be performed by processing unit 806 using computer usable program code, which may be located in a memory such as, for example, main memory 808, ROM 824, or in one or more peripheral devices 826 and 830, for example.

A bus system, such as bus 838 or bus 840 as shown in FIG. 8, may be comprised of one or more buses. Of course, the bus system may be implemented using any type of communication fabric or architecture that provides for a transfer of data between different components or devices attached to the fabric or architecture. A communication unit, such as modem 822 or network adapter 812 of FIG. 8, may include one or more devices used to transmit and receive data. A memory may be, for example, main memory 808, ROM 824, or a cache such as found in NB/MCH 802 in FIG. 8.

As mentioned above, in some illustrative embodiments the mechanisms of the illustrative embodiments may be implemented as application specific hardware, firmware, or the like, application software stored in a storage device, such as HDD 826 and loaded into memory, such as main memory 808, for executed by one or more hardware processors, such as processing unit 806, or the like. As such, the computing device shown in FIG. 8 becomes specifically configured to implement the mechanisms of the illustrative embodiments and specifically configured to perform the operations and generate the outputs described herein with regard to the embedding system and/or trained encoder-decoder network that is trained using the unsupervised contrastive machine learning operations based on similarity lists generated from the word representations of the illustrative embodiments.

Those of ordinary skill in the art will appreciate that the hardware in FIGS. 7 and 8 may vary depending on the implementation. Other internal hardware or peripheral devices, such as flash memory, equivalent non-volatile memory, or optical disk drives and the like, may be used in addition to or in place of the hardware depicted in FIGS. 7 and 8. Also, the processes of the illustrative embodiments may be applied to a multiprocessor data processing system, other than the SMP system mentioned previously, without departing from the spirit and scope of the present invention.

Moreover, the data processing system 800 may take the form of any of a number of different data processing systems including client computing devices, server computing devices, a tablet computer, laptop computer, telephone or other communication device, a personal digital assistant (PDA), or the like. In some illustrative examples, data processing system 800 may be a portable computing device that is configured with flash memory to provide non-volatile memory for storing operating system files and/or user-generated data, for example. Essentially, data processing system 800 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions that are executed by the at least on processor to cause the at least one processor to be specifically configured to implement a text encoder that encodes natural language text data input at least by:

training, by a contrastive machine learning training operation, an encoder of a machine learning computer model, to learn a sense and similarity preserving embedding, wherein the sense and similarity preserving embedding operates to encode input natural language text data to generate encoded natural language text data based on a sense attribute of one or more terms in the input natural language text data, wherein each encoding of the one or more terms in the encoded natural language text data is a tuple data structure having at least one value in the tuple data structure specifying the sense attribute, from one or more predetermined possible sense attributes, of a corresponding term in the one or more terms, and wherein the contrastive machine learning training operation operates to learn to separate positive samples in training data from negative samples in the training data;

processing, by the trained encoder computer model, a first term specified in an input natural language text to generate an encoded natural language text based on the learned sense and similarity preserving embedding; and inputting, to a downstream computing system, the encoded natural language text, to cause the downstream computing system to perform a computer natural language processing operation on the encoded natural language text data based on the sense and similarity preserving embedding.

2. The method of claim 1, wherein training the encoder by the contrastive machine learning training operation comprises, for each term in a vocabulary ontology data structure:

processing the vocabulary ontology data structure to represent the term as a first tuple data structure in which the first tuple data structure specifies a sense attribute of the corresponding term; and generating, for the term, at least one similarity list based on at least the sense attribute specified in the first tuple and a sense attribute specified in second tuples of other terms in the vocabulary ontology data structure; and wherein training the encoder further comprises:

inputting training data into the encoder, wherein the training data comprises, for each specified term in the vocabulary ontology data structure, first samples corresponding to generated similarity lists for the specified term, and second samples comprising negative samples specifying other terms in the vocabulary ontology data structure that are not similar to the specified term; and performing, by a decoder of the machine learning computer model, the contrastive learning operation based on the first samples and second samples and a contrastive loss function.

3. The method of claim 2, wherein each term in a subset of terms, comprising one or more terms in the vocabulary ontology data structure, has a plurality of tuples, each tuple corresponding to a different sense attribute of the same term.

4. The method of claim 3, wherein different terms in the one or more terms in the vocabulary ontology data structure have a different number of sense attributes and a different number of tuples.

5. The method of claim 2, wherein the first tuple data structure further comprises a first data value specifying the term, a second data value specifying a part of speech attribute, a third data value specifying the sense attribute, and a fourth data value that specifies a lemma attribute.

6. The method of claim 2, wherein inputting the training data into the encoder the training comprises an adaptive batching operation that divides the training data into batches comprising pairings of vector representations of the specified terms, in the vocabulary ontology data structure, with corresponding similarity lists of the specified terms, wherein each batch has a maximum size and comprises pairings whose members are disjointed and a number of pairings whose total size is equal to or less than the maximum size.

7. The method of claim 2, wherein generating the similarity lists comprises traversing the ontology data structure and, for each specified term in the ontology data structure, comprises generating, for each other term in the ontology data structure, a similarity metric value based on a depth of the other term in the ontology data structure and a least common ancestor of the other term and the specified term.

8. The method of claim 2, wherein the at least one similarity list comprises other terms in the vocabulary ontology data structure whose similarity metric is equal to or above a specified threshold and does not include other terms in the vocabulary ontology data structure whose similarity metric is below the specified threshold.

9. The method of claim 1, wherein the input natural language text data comprises a query term, and wherein the computer natural language processing operation is an operation to identify similar terms present in a vocabulary ontology data structure that are similar to the query term.

10. The method of claim 1, wherein the training of the encoder comprises an adaptive batching operation that divides training data into batches comprising pairings of vector representations of specified terms, in a vocabulary ontology data structure, with corresponding similarity lists of the specified terms, wherein each batch has a maximum size and comprises pairings whose members are disjointed, and a number of pairings whose total size is equal to or less than the maximum size.

11. A computer program product comprising a computer readable storage medium having a computer readable program stored therein, wherein the computer readable program, when executed on a data processing system, causes the data processing system to:

train, by a contrastive machine learning training operation, an encoder of a machine learning computer model, to learn a sense and similarity preserving embedding, wherein the sense and similarity preserving embedding operates to encode input natural language text data to generate encoded natural language text data based on a sense attribute of one or more terms in the input natural language text data, wherein each encoding of the one or more terms in the encoded natural language text data is a tuple data structure having at least one value in the tuple data structure specifying the sense attribute, from one or more predetermined possible sense attributes, of a corresponding term in the one or more terms, and wherein the contrastive machine learning training operation operates to learn to separate positive samples in training data from negative samples in the training data;

process, by the trained encoder computer model, a first term specified in an input natural language text to generate an encoded natural language text based on the learned sense and similarity preserving embedding; and input, to a downstream computing system, the encoded natural language text, to cause the downstream computing system to perform a computer natural language processing operation on the encoded natural language text data based on the sense and similarity preserving embedding.

12. The computer program product of claim 11, wherein training the encoder by the contrastive machine learning training operation comprises, for each term in a vocabulary ontology data structure:

processing the vocabulary ontology data structure to represent the term as a first tuple data structure in which the first tuple data structure specifies a sense attribute of the corresponding term; and generating, for the term, at least one similarity list based on at least the sense attribute specified in the first tuple and a sense attribute specified in second tuples of other terms in the vocabulary ontology data structure; and wherein training the encoder further comprises:

inputting training data into the encoder, wherein the training data comprises, for each specified term in the vocabulary ontology data structure, first samples corresponding to generated similarity lists for the specified term, and second samples comprising negative samples specifying other terms in the vocabulary ontology data structure that are not similar to the specified term; and performing, by a decoder of the machine learning computer model, the contrastive learning operation based on the first samples and second samples and a contrastive loss function.

13. The computer program product of claim 12, wherein each term in a subset of terms, comprising one or more terms in the vocabulary ontology data structure, has a plurality of tuples, each tuple corresponding to a different sense attribute of the same term.

14. The computer program product of claim 13, wherein different terms in the one or more terms in the vocabulary ontology data structure have a different number of sense attributes and a different number of tuples.

15. The computer program product of claim 12, wherein the first tuple data structure further comprises a first data value specifying the term, a second data value specifying a part of speech attribute, a third data value specifying the sense attribute, and a fourth data value that specifies a lemma attribute.

16. The computer program product of claim 12, wherein inputting the training data into the encoder the training comprises an adaptive batching operation that divides the training data into batches comprising pairings of vector representations of the specified terms, in the vocabulary ontology data structure, with corresponding similarity lists of the specified terms, wherein each batch has a maximum size and comprises pairings whose members are disjointed and a number of pairings whose total size is equal to or less than the maximum size.

17. The computer program product of claim 12, wherein generating the similarity lists comprises traversing the ontology data structure and, for each specified term in the ontology data structure, comprises generating, for each other term in the ontology data structure, a similarity metric value based on a depth of the other term in the ontology data structure and a least common ancestor of the other term and the specified term.

18. The computer program product of claim 12, wherein the at least one similarity list comprises other terms in the vocabulary ontology data structure whose similarity metric is equal to or above a specified threshold and does not include other terms in the vocabulary ontology data structure whose similarity metric is below the specified threshold.

19. The computer program product of claim 11, wherein the training of the encoder comprises an adaptive batching operation that divides training data into batches comprising pairings of vector representations of specified terms, in a vocabulary ontology data structure, with corresponding similarity lists of the specified terms, wherein each batch has a maximum size and comprises pairings whose members are disjointed, and a number of pairings whose total size is equal to or less than the maximum size.

20. An apparatus comprising:
at least one processor; and
at least one memory coupled to the at least one processor, wherein the at least one memory comprises instructions which, when executed by the at least one processor, cause the at least one processor to:
train, by a contrastive machine learning training operation, an encoder of a machine learning computer model, to learn a sense and similarity preserving embedding, wherein the sense and similarity preserving embedding operates to encode input natural language text data to generate encoded natural language text data based on a sense attribute of one or more terms in the input natural language text data, wherein each encoding of the one or more terms in the encoded natural language text data is a tuple data structure having at least one value in the tuple data structure specifying the sense attribute, from one or more predetermined possible sense attributes, of a corresponding term in the one or more terms, and wherein the contrastive machine learning training operation operates to learn to separate positive samples in training data from negative samples in the training data;
process, by the trained encoder computer model, a first term specified in an input natural language text to generate an encoded natural language text based on the learned sense and similarity preserving embedding; and
input, to a downstream computing system, the encoded natural language text, to cause the downstream computing system to perform a computer natural language processing operation on the encoded natural language text data based on the sense and similarity preserving embedding.

* * * * *